(12) United States Patent
Choi et al.

(10) Patent No.: US 9,651,811 B2
(45) Date of Patent: May 16, 2017

(54) DISPLAY DEVICE AND METHOD OF MANUFACTURING THE SAME

(71) Applicant: Samsung Display Co., Ltd., Yongin-si (KR)

(72) Inventors: Nakcho Choi, Hwaseong (KR); Jae Cheol Park, Hwaseong-si (KR); Min-Woo Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/942,144

(22) Filed: Nov. 16, 2015

(65) Prior Publication Data

US 2016/0070134 A1   Mar. 10, 2016

Related U.S. Application Data

(63) Continuation of application No. 13/750,433, filed on Jan. 25, 2013, now Pat. No. 9,207,472.

(30) Foreign Application Priority Data

Aug. 27, 2012   (KR) .................. 10-2012-0093847

(51) Int. Cl.
*G02F 1/1333*   (2006.01)
*G02F 1/1335*   (2006.01)
(Continued)

(52) U.S. Cl.
CPC ...... *G02F 1/133377* (2013.01); *G02F 1/1303* (2013.01); *G02F 1/1333* (2013.01);
(Continued)

(58) Field of Classification Search
CPC .... G02F 1/161; G02F 1/133377; G02F 1/155; G02F 1/1335; G02F 1/1337;
(Continued)

(56) References Cited

U.S. PATENT DOCUMENTS 5,949,508 A   9/1999 Kumar et al.
5,956,112 A   9/1999 Fujimori et al.
(Continued)

FOREIGN PATENT DOCUMENTS

JP   2000-330130   11/2000
JP   2008-225156   9/2008
(Continued)

OTHER PUBLICATIONS

Notice of Allowance dated Aug. 5, 2015, in U.S. Appl. No. 13/750,433.
(Continued)

*Primary Examiner* — Thoi Duong
(74) *Attorney, Agent, or Firm* — H.C. Park & Associates, PLC

(57) ABSTRACT

A display device includes a substrate, a cover layer, a liquid crystal layer, at least one electrode, and a sealant layer. The cover layer is disposed on the substrate and includes a tunnel-shaped cavity. The liquid crystal layer is disposed in the tunnel-shaped cavity. The at least one electrode is configured to apply an electric field to the liquid crystal layer. The sealant layer is configured to seal the tunnel-shaped cavity. The liquid crystal layer includes a plurality of domains defined by liquid crystal molecules pre-aligned in different directions.

14 Claims, 29 Drawing Sheets

(51) Int. Cl.
*G02F 1/13* (2006.01)
*G02F 1/1339* (2006.01)
*G02F 1/1343* (2006.01)
*G02F 1/1362* (2006.01)
*G02F 1/13363* (2006.01)
*G02F 1/1337* (2006.01)

(52) U.S. Cl.
CPC ........ *G02F 1/1339* (2013.01); *G02F 1/13363* (2013.01); *G02F 1/13439* (2013.01); *G02F 1/133528* (2013.01); *G02F 1/136209* (2013.01); *G02F 2001/133531* (2013.01); *G02F 2001/133638* (2013.01); *G02F 2001/133757* (2013.01); *G02F 2001/136222* (2013.01)

(58) Field of Classification Search
CPC ................. G02F 1/1339; G02F 1/1341; G02F 1/136209; G02F 1/1333; G02F 1/133528; G02F 1/13363; G02F 1/133512; G02F 1/13; G02F 1/133723; G02F 1/136286; G02F 1/133305; G02F 1/133345; G02F 1/133365; G02F 1/133514; G02F 1/133753; G02F 2001/1672; G02F 2001/136222; G02F 2001/133531; G02F 2001/133638; G02F 2001/133757; H01L 27/3244; H01L 27/3276; H01L 51/524; Y10T 29/49826; Y10T 29/4911; Y10T 428/10; Y10T 428/23; Y10T 428/239; C09J 163/00; C09K 2019/546

USPC ..... 349/106, 153, 96, 122, 138, 139, 42, 89, 349/92, 129, 117, 110
See application file for complete search history.

(56) References Cited

U.S. PATENT DOCUMENTS

| | | |
|---|---|---|
| 6,111,624 A | 8/2000 | Matsuoka et al. |
| 6,469,761 B1 | 10/2002 | Drabik et al. |
| 6,504,592 B1 | 1/2003 | Takatori et al. |
| 6,549,257 B2 | 4/2003 | Liu |
| RE38,288 E | 10/2003 | Yamada et al. |
| 7,123,319 B2 | 10/2006 | Broer et al. |
| 7,561,237 B2 | 7/2009 | Lee |
| 2009/0046231 A1 | 2/2009 | Lu et al. |
| 2011/0085114 A1 | 4/2011 | Park et al. |
| 2013/0258256 A1 | 10/2013 | Kim et al. |

FOREIGN PATENT DOCUMENTS

| | | |
|---|---|---|
| KR | 10-2003-0063656 | 7/2003 |
| KR | 10-2006-0083713 | 7/2006 |
| KR | 10-2007-0044201 | 4/2007 |

OTHER PUBLICATIONS

Final Office Action dated Apr. 29, 2015, in U.S. Appl. No. 13/750,433.
Non-Final Office Action dated Dec. 26, 2014, in U.S. Appl. No. 13/750,433.

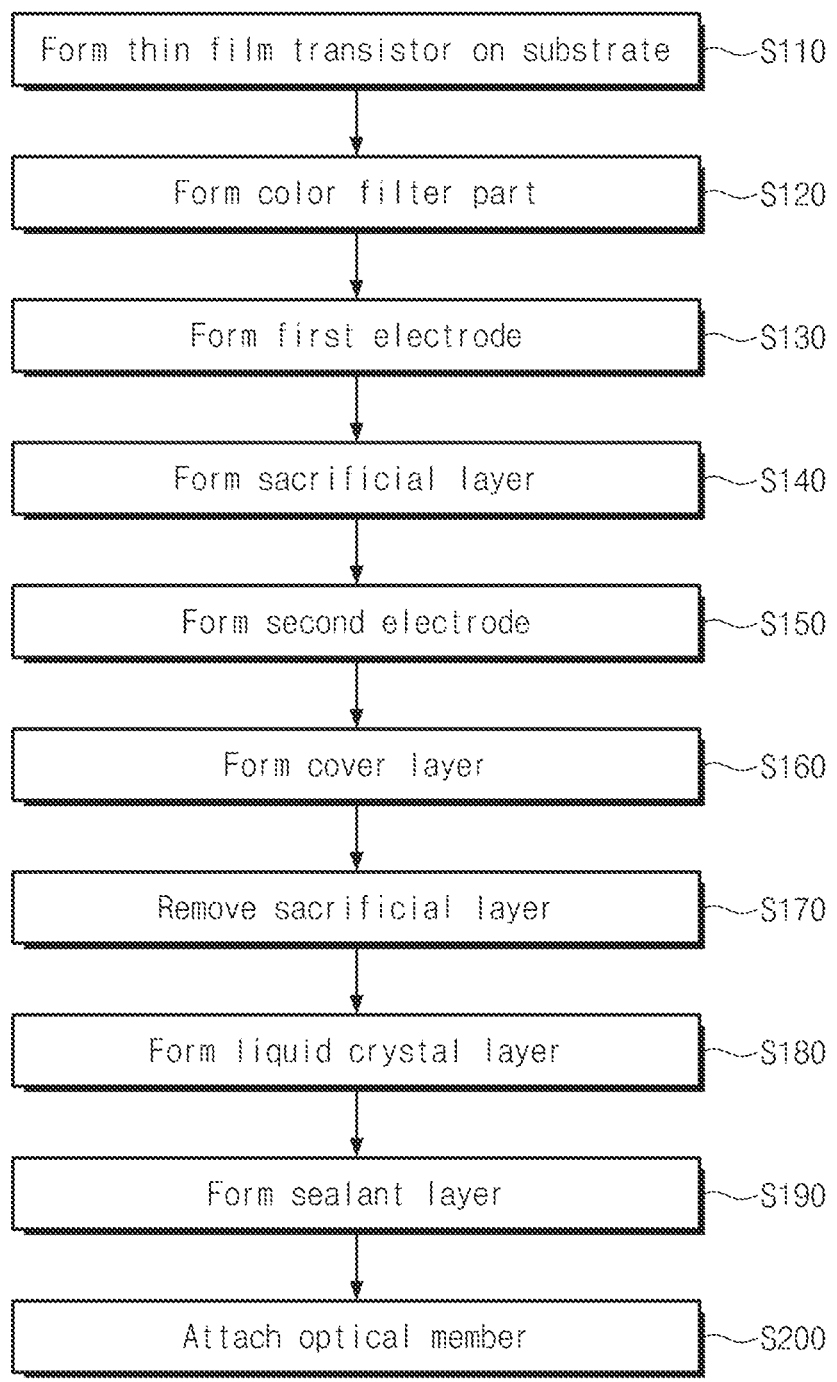

DISPLAY DEVICE AND METHOD OF MANUFACTURING THE SAME

CROSS-REFERENCE TO RELATED APPLICATION

This application is a continuation of U.S. patent application Ser. No. 13/750,433, filed on Jan. 25, 2013, and claims priority from and the benefit of Korean Patent Application No. 10-2012-0093847, filed on Aug. 27, 2012, each of which is incorporated by reference for all purposes as if set forth herein.

BACKGROUND

Field

Exemplary embodiments relate to display technology, and more particularly to display devices and methods of manufacturing display devices.

Discussion

Within the consumer segment, flat panel display devices, e.g., liquid crystal displays, organic light emitting diode displays, electrophoretic displays, electrowetting displays, plasma displays, field emission displays, etc., have supplanted cathode ray tube displays.

Typically, a flat panel display device includes two substrates facing each other and an image display device interposed between the two substrates, e.g., a liquid crystal layer, an electrophoretic layer, etc. The two substrates are, generally speaking, attached to each other while facing each other and spaced apart from each other so that the image display layer may be disposed between the two substrates.

Conventionally, flat panel display devices have been manufactured via use of at least one spacer formed on one of the two substrates to maintain a distance between the two substrates. In this manner, the other one of the two substrates is attached to the spacer via, for example, an adhesive or any other suitable bonding or coupling technique. Accordingly, such manufacturing processes are complicated and increase unit costs, especially when considering fabrication of flat panel devices to ensure wide viewing angles.

Therefore, there is a need for an approach that provides less complex and more cost effective techniques to manufacture flat panel displays, including flat panel displays with wide viewing angles.

The above information disclosed in this Background section is only for enhancement of understanding of the background of the invention and, therefore, it may contain information that does not form any part of the prior art nor what the prior art may suggest to a person of ordinary skill in the art.

SUMMARY

Exemplary embodiments provide a display device with a wide viewing angle, as well as a method of manufacturing the display device that is less complex and more cost effective.

Additional aspects will be set forth in the detailed description which follows and, in part, will be apparent from the disclosure, or may be learned by practice of the invention.

According to exemplary embodiments, a display device includes: a substrate, a cover layer, a liquid crystal layer, at least one electrode, and a sealant layer. The cover layer is disposed on the substrate and includes a tunnel-shaped cavity. The liquid crystal layer is disposed in the tunnel-shaped cavity. The at least one electrode is configured to apply an electric field to the liquid crystal layer. The sealant layer is configured to seal the tunnel-shaped cavity. The liquid crystal layer includes a plurality of domains defined by liquid crystal molecules pre-aligned in different directions.

According to exemplary embodiments, a method of manufacturing a display device includes: forming a first electrode on a substrate; forming a second electrode on the substrate, the second electrode being insulated from the first electrode; forming a tunnel-shaped cavity on the substrate; providing, in association with a first pressure, liquid crystal molecules in the tunnel-shaped cavity; and depositing, in association with a second pressure, an organic polymer on the substrate to form a sealant layer configured to seal the liquid crystal molecules in the tunnel-shaped cavity. The liquid crystal molecules disposed in the tunnel-shaped cavity comprise a plurality of pre-alignment directions defining a plurality of domains.

According to exemplary embodiments, a display panel includes: a substrate; a plurality of electrodes disposed on the substrate; a cover layer disposed on the plurality of electrodes, the cover layer including a void disposed association with a display region of the display panel; and liquid crystal molecules disposed in the void. The liquid crystal molecules are disposed between the plurality of electrodes.

According to exemplary embodiments, when a display device is manufactured, a process of attaching two substrates to each other is omitted. In addition, use of a substrate and a liquid crystal layer is reduced. Thus, fabrication time and cost of associated display devices may be noticeably reduced. It is also noted that exemplary embodiments enable liquid crystal molecules of a liquid crystal layer to be aligned in one or more predetermined directions to define one or more domains even though an alignment layer is not formed. As such, a viewing angle of associated display devices is widened, while also reducing complexity and cost of manufacturing the display devices.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 4 is a flowchart of a process to manufacture a display device, according to exemplary embodiments.

DETAILED DESCRIPTION

Figure 1:
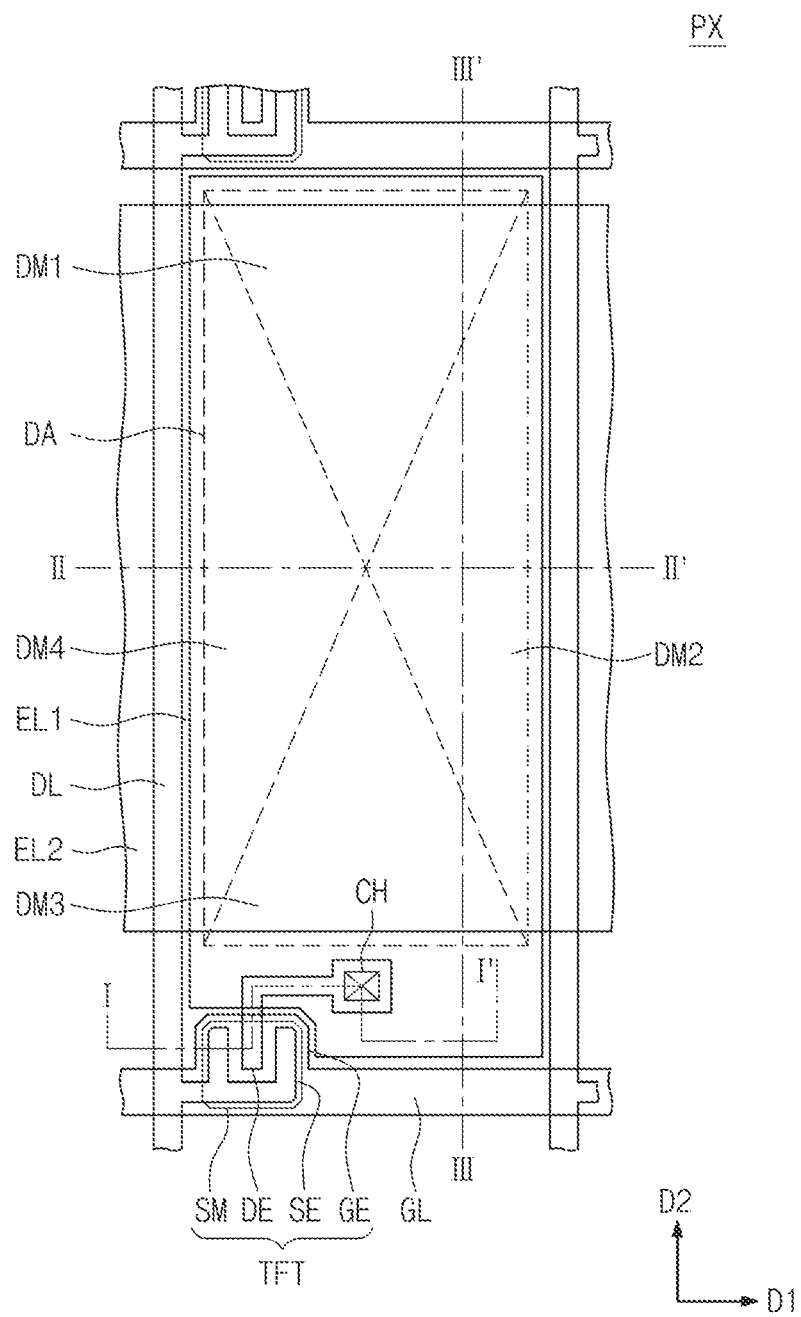
FIG. 1 is a plan view of a portion of a display device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or directly coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper," and/or the like, may be used herein for descriptive purposes and, thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2A:
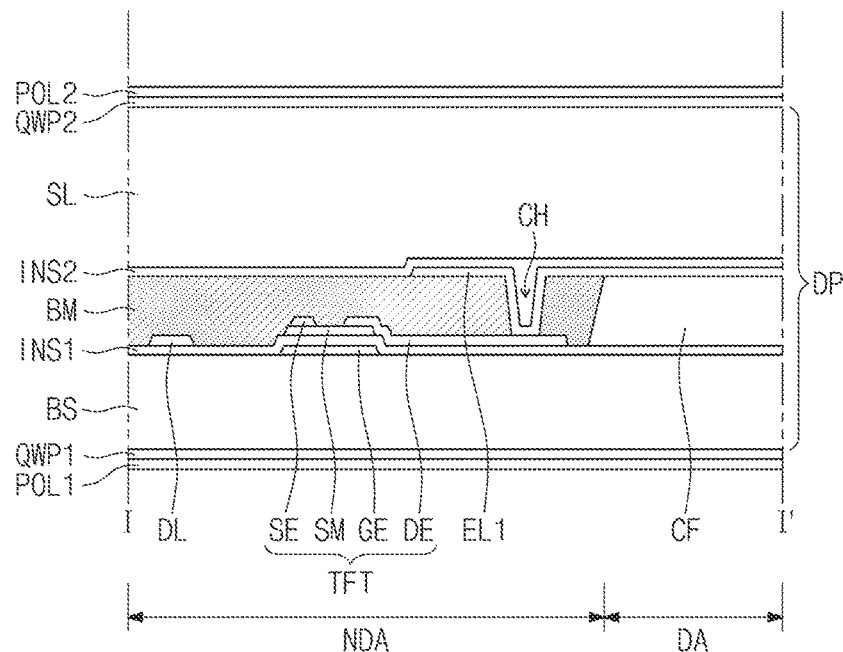
FIGS. 2A-2C are cross-sectional views of the display device of FIG. 1 respectively taken along sectional lines I-I', II-II', III-III', according to exemplary embodiments.
Figure 2B:
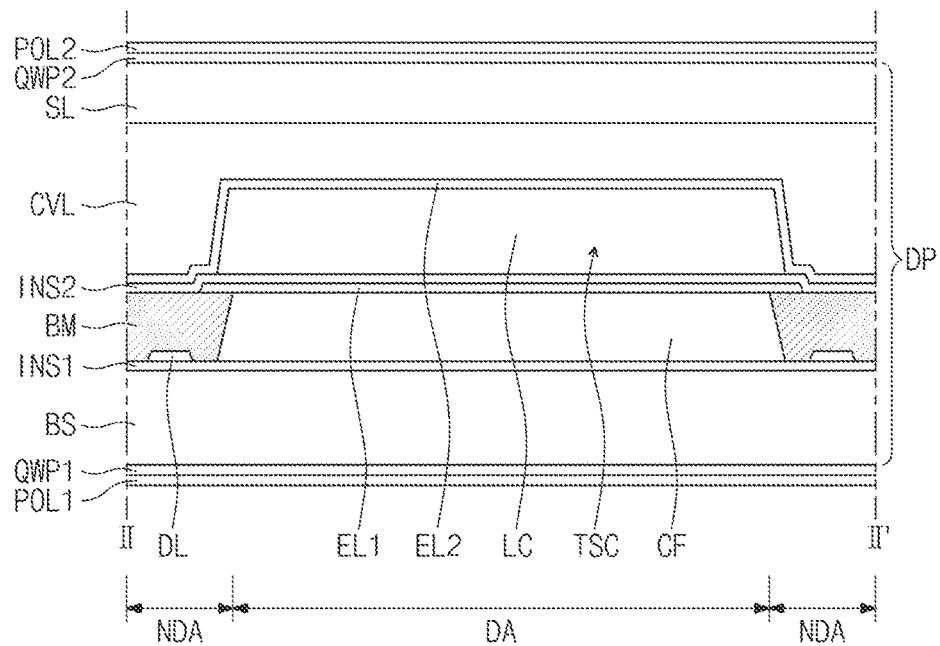
Figure 2C:
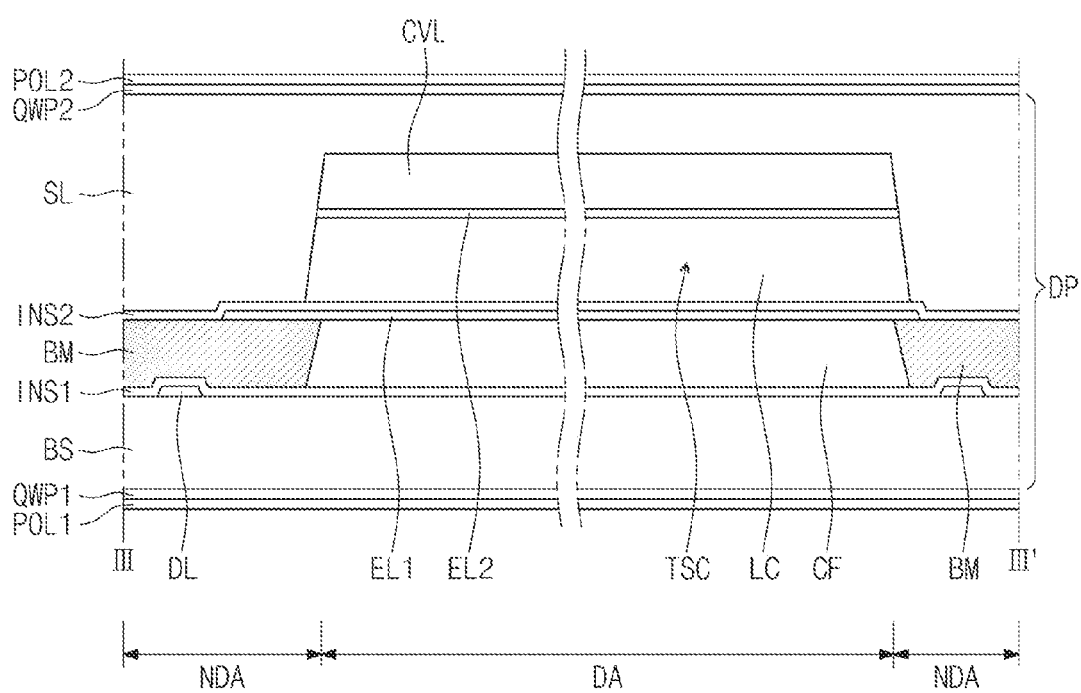

FIG. 1 is a plan view of a portion of a display device, according to exemplary embodiments. FIGS. 2A-2C are cross-sectional views of the display device of FIG. 1 respectively taken along sectional lines I-I', II-II', III-III'.

Referring to FIGS. 1, 2A, 2B, and 2C, a display device (or apparatus) includes a display panel DP and optical members (e.g., first and second quarter wave plates QWP1 and QWP2 and first and second polarization plates POL1 and POL2) respectively provided on upper and lower surfaces of the display panel DP. While specific reference will be made to this particular implementation, it is contemplated that the display device may embody many forms and include multiple and/or alternative components or features. For example, it is contemplated that the components of the display device may be combined, located in separate structures, and/or separate locations.

The display panel DP includes a base substrate BS, color filters CF disposed on the base substrate BS, a black matrix BM disposed between the color filters CF, and a pixel.

According to exemplary embodiments, the pixel PX is provided as part of a plurality of pixels and the plurality of pixels are arranged in, for instance, a matrix (or other suitable) form. Since the pixels PX have the same structure and function, for the convenience of explanation, one pixel will be described in detail as a representative example. In FIGS. 1-2C, the pixel PX has a rectangular shape extended in one direction (e.g., direction D2), but the shape of the pixel PX is not limited to the rectangular shape and, as such, may be any suitable geometric shape. For instance, the pixel PX may have various shapes, e.g., a V shape, a Z shape, etc., when viewed in a plan view.

The base substrate BS may be, but not limited to, an insulating substrate, e.g., a silicon substrate, a glass substrate, a plastic substrate, etc. In addition, the base substrate BS may be transparent or non-transparent. The base substrate BS may include a plurality of pixel areas corresponding to the pixels in a one-to-one correspondence, and each of the pixel areas includes a corresponding display area DA in which an image may be displayed and a non-display area NDA disposed adjacent to at least one side of the display area DA and corresponding to an area not including the display area DA.

A line part used to transmit signals to the pixel PX and a thin film transistor TFT (or any other suitable switching element) used to, in association with one or more controllers/processors (not shown), drive the pixel PX are disposed on the base substrate BS. The line part and the thin film transistor TFT are disposed in the non-display area NDA.

The line part includes a gate line GL and a data line DL, which are disposed in the non-display area NDA.

The gate line GL is extended in (or substantially in) a first direction D1 on the base substrate BS.

The data line DL is disposed on the base substrate BS and is insulated from the gate line GL by, for instance, a first insulating layer INS1. The gate line GL is covered by the first insulating layer INS1. The first insulating layer INS1 may be or include an insulating material, e.g., silicon nitride, silicon oxide, etc. The data line DL is extended in a second direction D2. The second direction D2 crosses the first direction D1. For instance, the second direction D2 may be perpendicular (or substantially perpendicular) to D1.

The thin film transistor TFT is connected to the gate line GL and the data line DL. The thin film transistor TFT includes a gate electrode GE, a semiconductor layer SM, a source electrode SE, and a drain electrode DE.

The gate electrode GE is protruded from the gate line GL or disposed on a portion of the gate line GL. The gate line GL and the gate electrode GE are (or include) a metal material. For instance, the gate line GL and the gate electrode GE may include nickel, chromium, molybdenum, aluminum, titanium, copper, tungsten, etc., as well as alloys thereof. The gate line GL and the gate electrode GE may be (or include) a single-layer structure or a multi-layer structure of the above-mentioned metals. For instance, the gate line GL and the gate electrode GE may include a triple-layer structure of molybdenum, aluminum, and molybdenum, which are sequentially stacked on one another, a double-layer structure of titanium and copper sequentially stacked, or a single-layer structure of an alloy of titanium and copper. As previously mentioned; however, any suitable combination of one or more layers and/or one or more materials may be utilized.

The first insulating layer INS1 is disposed on the base substrate BS and covers the gate electrode GE.

The semiconductor layer SM is disposed on the first insulating layer INS1 to correspond to the gate line GL. The source electrode SE is branched from the data line DL and overlaps at least a portion of the semiconductor layer SM. The drain electrode DE also overlaps at least a portion of the semiconductor layer SM. In this manner, the drain electrode DE is spaced apart from the source electrode SE. The semiconductor layer SM is configured to serve as a conductive channel between the source electrode SE and the drain electrode DE.

The source electrode SE and the drain electrode DE may be (or include) a conductive material, e.g., a metal material. Each of the source electrode SE and the drain electrode DE may be (or include) a single metal, two or more metals, or a metal alloy. For instance, each of the source electrode SE and the drain electrode DE may include nickel, chromium, molybdenum, aluminum, titanium, copper, tungsten, etc., as well as alloys thereof. In addition, each of the source electrode SE and the drain electrode DE may be (or include) a single-layer structure or a multi-layer structure. For example, each of the source and drain electrodes SE and DE may include a double-layer structure of titanium and copper. As previously mentioned; however, any suitable combination of one or more layers and/or one or more materials may be utilized.

Each of the color filters CF is configured to allow light (or any other suitable illumination) passing through a corresponding pixel PX of the pixels PX to have color. The color filters CF include, for instance, a red color filter, a green color filter, and a blue color filter. It is contemplated; however, that any other suitable colors may be utilized, such as yellow color filters, white color filters, etc. The red, green, and blue color filters are arranged to correspond to the pixels PX in one-to-one correspondence. In addition, the color filters CF may further include a white color filter. The color filters CF may be arranged to allow adjacent pixels PX to have different colors. Although not shown in figures, the color filters CF adjacent to each other may partially overlap each other in a boundary portion between the pixels PX.

The black matrix BM is disposed in the non-display area NDA to block the light not necessary to display an image in the display area DA. That is, the black matrix BM is configured to prevent light leakage from occurring at the edge of the image display layer, which can be caused by, for instance, the liquid crystal molecules. The black matrix BM is also configured to prevent colors from being mixed with each other, which can occur at the edge of the pixels PX due to overlapping of the color filters CF. The black matrix BM is disposed at least one side of each color filter CF, and may surround each color filter CF.

The black matrix BM may include a contact hole CH formed therethrough that is configured to expose a portion of the drain electrode DE of the thin film transistor TFT.

Although not shown in figures, a protective layer may be disposed between the thin film transistor TFT and the color filters CF to protect the channel of the thin film transistor TFT. In this manner, the protective layer may be configured to cover an exposed portion of the semiconductor layer SM exposed in association with, for instance, the channel between the source electrode SE and the drain electrode DE.

The pixel PX is disposed on the base substrate BS. The pixel PX includes a cover layer CVL that defines a tunnel-shaped cavity TSC together with the base substrate BS, a liquid crystal layer LC disposed in the tunnel-shaped cavity TSC, and first and second electrodes EL1 and EL2 that, when driven, are configured to control liquid crystal molecules (not illustrated) of the liquid crystal layer LC.

The first electrode EL1 is disposed on the color filter CF and is connected to the thin film transistor TFT through the contact hole CH of the black matrix BM. A second insulating layer INS2 is disposed on the first electrode EL1 to protect the first electrode EL1. It is noted, however, that the second insulating layer INS2 may be omitted. The second insulating layer INS2 may include an inorganic insulating material or an organic insulating material.

According to exemplary embodiments, the contact hole CH may be formed by partially removing the black matrix BM, but may be formed in any other suitable manner. For instance, the contact hole CH may be formed by partially removing the color filter CF.

The cover layer CVL is extended in the first direction D1 and is disposed on the second insulating layer INS2. The cover layer CVL is spaced apart from the upper surface of the second insulating layer INS2 and, thereby, defines the tunnel-shaped cavity TSC in association with the second insulating layer INS2. In other words, the cover layer CVL is spaced apart upward from the second insulating layer INS2 in the display area DA to provide a predetermined space (or void) between the cover layer CVL and the second insulating layer INS2. The space is not formed between the cover layer CVL and the second insulating layer INS2 along the second direction D2 in the non-display area NDA. As a result, the tunnel-shaped cavity TSC has a shape extended in the second direction D2, and both end portions of the tunnel-shaped cavity TSC, i.e., an end portion of the tunnel-shaped cavity TSC in the second direction D2 and an end portion of the tunnel-shaped cavity TSC in the opposite direction to the second direction D2, are open since the cover layer CVL is not formed in the end portions of the tunnel-shaped cavity TSC. However, the extended direction of the cover layer CVL is not limited thereto or thereby and, as such, may be alternatively configured.

The second electrode EL2 is disposed on the upper surface of the cover layer CVL and extended in the first direction D1 in which the cover layer CVL is extended. When driven, a voltage differential between the second electrode EL2 and the first electrode EL1 is configured to form an electric field. The second electrode EL2 is commonly shared by the pixels PX arranged in the first direction D1. The second electrode EL2 is spaced apart upward from the second insulating layer INS2 in the display area DA and directly makes contact with the second insulating layer INS2 in the non-display area NDA.

The second electrode EL2 is connected to a common voltage line (not shown) disposed in the non-display area NDA. The second electrode EL2 is applied with a common voltage via the common voltage line.

The first and second electrodes EL1 and EL2 may be (or include) a transparent conductive material or a non-transparent conductive material, e.g., a metal material. That is, the first and second electrodes EL1 and EL2 may include the transparent or non-transparent conductive material in accordance with a configuration of the overall display device. For instance, in the case that the display device is a transmission type display device in which a backlight unit is disposed under the base substrate BS, the first and second electrodes EL1 and EL2 may be formed of one or more the transparent conductive materials. In the case that the display device is a reflection type display device that does not necessarily need a separate light source, the first electrode EL1 may be (or include) one or more non-transparent conductive materials that is configured to reflect the light, whereas the second electrode EL2 may be (or include) one or more transparent conductive materials. Transparent conductive materials may include a transparent conductive oxide, e.g., indium tin oxide, indium zinc oxide, indium tin zinc oxide, etc. Non-transparent conductive materials may include a metal material, e.g., nickel, chromium, molybdenum, aluminum, titanium, copper, tungsten, etc., and/or alloys thereof. Other elements of the display device may be (or include) the transparent or non-transparent conductive material in accordance with the overall configuration of the display device.

The liquid crystal layer LC is disposed in the tunnel-shaped cavity TSC. According to exemplary embodiments, the liquid crystal layer LC is disposed between the first electrode EL1 and the second electrode EL, which face each other, and orientation of liquid crystal molecules of the liquid crystal layer LC are controlled by the electric field, which may be imposed in association with the display of an image.

The liquid crystal layer LC includes the liquid crystal molecules. The liquid crystal molecules have a positive anisotropic dielectric constant ($\Delta e > 0$). Thus, when the electric field is applied to the liquid crystal layer LC, a long axis of the liquid crystal molecules is arranged parallel (or substantially parallel) to the direction of the electric field. When the electric field is not applied to the liquid crystal layer LC, the long axis of the liquid crystal molecules is arranged in a direction parallel (or substantially parallel) to the upper surface of the base substrate BS.

In exemplary embodiments, the liquid crystal molecules are arranged in different directions according to the shape of the tunnel-shaped cavity TSC, and as a result, the pixel PX may include a plurality of domains in which the liquid crystal molecules are arranged in different directions. For instance, the tunnel-shaped cavity TSC may have a rectangular shape with a pair of short sides and a pair of long sides, so that the pixel PX has four domains, i.e., a first, a second, a third, and a fourth domain DM1, DM2, DM3, and DM4. As seen in FIG. 1, domains DM1, DM2, DM3, and DM4 are defined by dividing the rectangular shape along corresponding diagonal lines connecting opposite vertices of the rectangular shape. The number and shape of the domains may depend on the shape of the tunnel-shaped cavity TSC.

As previously mentioned, the liquid crystal layer LC includes the liquid crystal molecules having an optical anisotropy. As such, the liquid crystal molecules may be operated (e.g., orientated) by the electric field to transmit or block light incident on the liquid crystal layer LC.

According to exemplary embodiments, an additional inorganic insulating layer (not shown) may be disposed between the liquid crystal layer LC and the second electrode EL2 and/or between the second electrode EL2 and the cover layer CVL. The additional inorganic insulating layer may include silicon nitride, silicon oxide, etc. The additional inorganic insulating layer may be configured to support the cover layer CVL and, thereby, to allow the cover layer CVL to stably maintain the tunnel-shaped cavity TSC region.

A sealant layer SL is disposed on the cover layer CVL. The sealant layer SL is configured to cover the display area DA and the non-display area NDA. The sealant layer SL blocks the end portions of the tunnel-shaped cavity TSC to seal the tunnel-shaped cavity TSC, such as seen in FIG. 2C. In this manner, the tunnel-shaped cavity TSC may be sealed and, thereby, bounded by the second insulating layer INS2 (or the first electrode EL1 when the second insulating layer INS2 is omitted), the second electrode EL2, and the sealant layer SL.

The sealant layer SL may include an organic polymer. As an example, the organic polymer may be poly(p-xylene) polymer, i.e., parylene. In detail, the organic polymer may be parylene-N, parylene-C, or parylene-HT. The parylene-N, parylene-C, and parylene-HT have the following formulas 1 to 3, respectively.

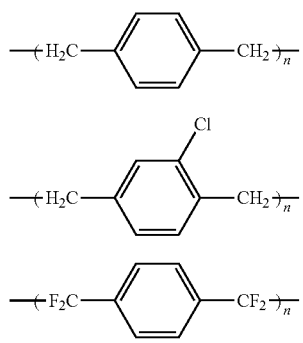

The optical members, as described in more detail below, may be used to control optical properties of the light propagating through the liquid crystal layer LC, e.g., control a phase delay, a polarization, etc. In this manner, the optical members may include first and second polarization plates POL1 and POL2 and first and second quarter wave plates QWP1 and QWP2, respectively.

The first polarization plate POL1 and the second polarization plate POL2 are disposed on the lower and upper surfaces of the display panel DP, respectively. The first quarter wave plate QWP1 is disposed between the display panel DP and the first polarization plate POL1, and the second quarter wave plate QWP2 is disposed between the display panel DP and the second polarization plate POL2.

The first polarization plate POL1 has a polarization axis perpendicular (or substantially perpendicular) to that of the second polarization plate POL2, and the first quarter wave plate QWP1 has an optical axis perpendicular (or substantially perpendicular) to that of the second quarter wave plate QWP2. As such, an angle between the polarization axis of the first polarization plate POL1 and the optical axis of the first quarter wave plate QWP1 is in a range from about zero (0) to about 90 degrees, e.g., about 15 to 75 degrees, such as about 45 degrees. For descriptive purposes, exemplary embodiments will be, hereinafter, described in association with the assumption that the angle is about 45 degrees.

Accordingly, the liquid crystal molecules may be operated in an electrically-controlled birefringence (ECB) mode. It is contemplated, however, that one or more of the optical members may be wholly or partially omitted or may further include additional elements, such as, in accordance with the type of liquid crystal layer LC utilized, e.g., whether a positive or negative anisotropic dielectric constant is utilized, and the operation mode of the display device, e.g., whether an in-plane switching mode, a vertical alignment mode, an ECB mode, etc., are utilized. In addition, the arrangements of the polarization axis of the first and second polarization plates POL1 and POL2 and the optical axes of the first and second quarter wave plates QWP1 and QWP2 may be changed according to the type of the liquid crystal layer LC and the operation mode of the display device.

When a gate signal is applied to the gate electrode GE via the gate line GL, and a data signal is applied to the source electrode SE via the data line DL, the conductive channel (hereinafter, referred to as channel) is formed in the semiconductor layer SM. Accordingly, the thin film transistor TFT is turned on and the data signal is applied to the first electrode EL1, which, thereby, generates the electric field between the first electrode EL1 and the second electrode EL2. The liquid crystal molecules are oriented according to the electric field and the amount of light passing through the liquid crystal layer LC is controlled to thereby display one or more desired images.

Figure 3A:
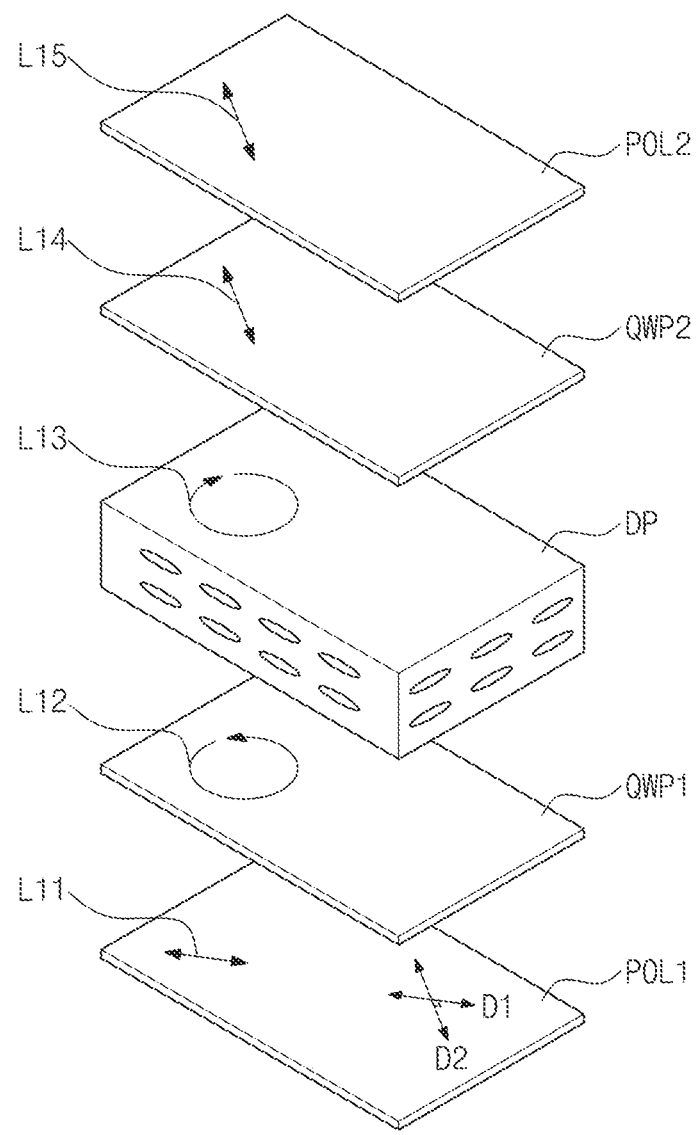
FIG. 3A is an exploded perspective view of optical characteristics of the display device of FIG. 1 when no source voltage is applied to a display panel, according to exemplary embodiments.
Figure 3B:
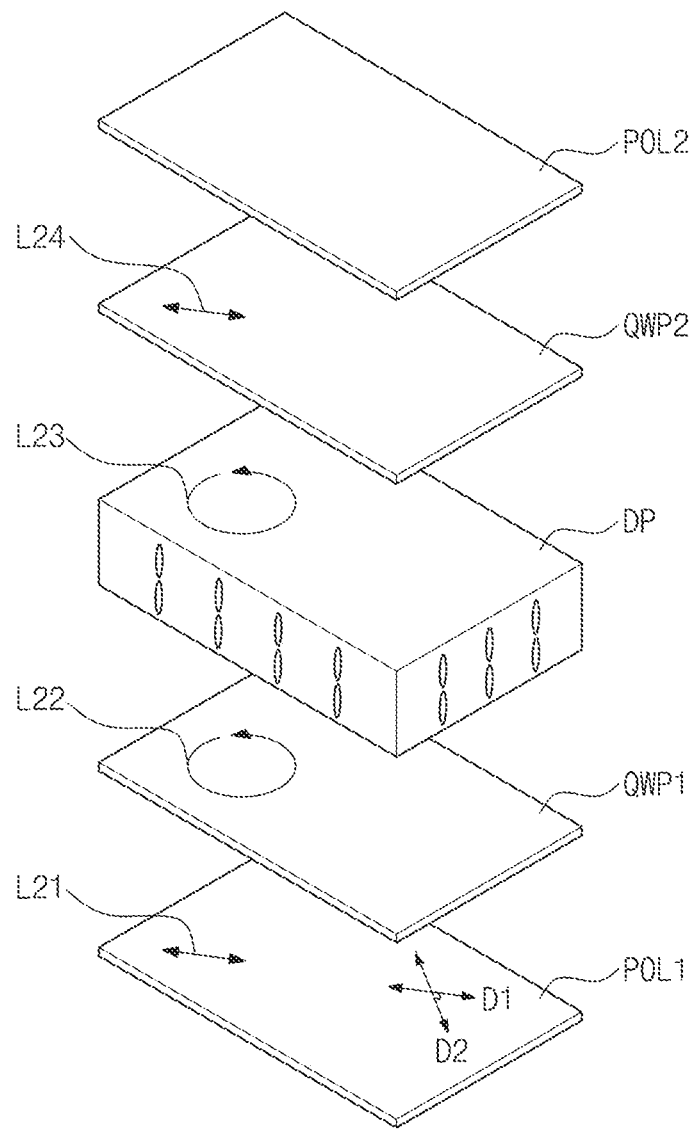
FIG. 3B is an exploded perspective view of optical characteristics of the display device of FIG. 1 when at least one source voltage is applied to a display panel, according to exemplary embodiments.

FIG. 3A is an exploded perspective view of optical characteristics of the display device of FIG. 1 when no source voltage is applied to a display panel, whereas FIG. 3B is an exploded perspective view of optical characteristics of the display device of FIG. 1 when a source voltage is applied to a display panel, according to exemplary embodiments. Although not shown in FIGS. 3A and 3B, the light source may be disposed under the display panel DP to radiate light towards the display panel DP. In addition, for the convenience of explanation, a direction parallel (or substantially parallel) to the polarization axis of the first polarization plate POL is referred to as a third direction D3 and a direction perpendicular (or substantially perpendicular) to the third direction D3 is referred to as a fourth direction D4.

Referring to FIG. 3A, light generated from the light source is polarized in the third direction D3 parallel (or substantially parallel) to the polarization axis of the first polarization plate POL1, while propagating through the first polarization plate POL1. In this manner, the light becomes a first linearly-polarized light L11. The first linearly-polarized light L11 propagates through the first quarter wave plate QWP1 and, thereby, becomes a first circularly-polarized light L12 rotated in a predetermined direction. As an example, the first circularly-polarized light L12 is rotated in a counter-clockwise direction.

As previously mentioned, since source voltage is not applied to the display panel DP in association with the illustration of FIG. 3A, the liquid crystal molecules of the liquid crystal layer LC of the display device are arranged in a horizontal direction, i.e., having their long axis parallel (or substantially parallel) to the surface of the base substrate BS. Accordingly, the first circularly-polarized light L12 becomes a second circularly-polarized light L13 rotated in an opposite direction to the predetermined direction via propagation through the display panel DP. As an example, the second circularly-polarized light L13 is rotated in a clockwise direction.

The second circularly-polarized light L13 propagates through the second quarter wave plate QWP2 and, thereby, becomes a second linearly-polarized light L14 polarized in the fourth direction D4, i.e., a direction perpendicular (or substantially perpendicular) to the polarization axis of the first polarization plate POL1. Since the second linearly-polarized light L14 is parallel (or substantially parallel) to the polarization axis of the second polarization plate POL2, the second linearly-polarized light L14 may propagate through the second polarization plate POL2 as light L15. In this manner, a viewing plane (e.g., screen) of the display device may be perceived by a viewer as white.

Referring to FIG. 3B, light generated from the light source is polarized in the third direction D3 parallel (or substantially parallel) to the polarization axis of the first polarization plate POL1 via propagation through the first polarization plate POL1. In this manner, the light becomes a first linearly-polarized light L21. The first linearly-polarized light L21 propagates through the first quarter wave plate QWP1 and, thereby, becomes a first circularly-polarized light L22 rotated in the predetermined direction. As an example, the first circularly-polarized light L22 is rotated in the counter-clockwise direction.

As previously mentioned, since the source voltage is applied to the display panel DP in association with the illustration of FIG. 3B, the liquid crystal molecules of the liquid crystal layer LC of the display device are arranged in a vertical direction, i.e., having their long axis perpendicular (or substantially perpendicular) to the surface of the base substrate BS. Accordingly, the first circularly-polarized light L22 becomes a second circularly-polarized light L23 rotated in the predetermined direction via propagation through the display panel DP. That is, the first circularly-polarized light L22 passes through the display panel DP without being polarized, so that the second circularly-polarized light L23 is rotated in the counter-clockwise direction.

The second circularly-polarized light L23 propagates through the second quarter wave plate QWP2 and, thereby, becomes a second linearly-polarized light L24 polarized in the third direction D3, i.e., the direction parallel (or substantially parallel) to the polarization axis of the first polarization plate POL1. Since the second linearly-polarized light L24 is perpendicular (or substantially perpendicular) to the polarization axis of the second polarization plate POL2, the second linearly-polarized light L24 does not pass through the second polarization plate POL2. In this manner, the viewing plane (e.g., screen) of the display device may be perceived by a viewer as black.

As described above, it is noted that the display device is operated in a normally white mode. In other words, when the source voltage is not applied to the display device, light propagates through the display panel DP so as to display white on the display panel DP. As such, when the source voltage is applied to the display device, the light is blocked by the display panel DP so as to display black on the display panel DP. Accordingly, since the display device is operated in the normally white mode, power consumption of the display device operated in the normally white mode is reduced as compared to that of the display device operated in a normally black mode, which utilizes continuously applied source voltage to the display panel DP in order to display black.

FIG. 4 is a flowchart of a process to manufacture a display device, according to exemplary embodiments.

Referring to FIG. 4, the thin film transistor TFT and the color filters CF are formed on the base substrate BS (S110 and S120). The first electrode EL1, a sacrificial layer SCR, the second electrode EL2, and the cover layer CVL are sequentially formed on the color filters CF (S130, S140, S150, and S160). The sacrificial layer SCR is removed (S170). The liquid crystal layer LC is formed (S180) and the sealant layer SL configured to seal the liquid crystal layer LC (S190) is formed. The optical member(s) are formed/attached (S200).

FIGS. 5A, 6A, 7A, 8A, and 9A are plan views of parts of a display device at various stages of manufacture, according to exemplary embodiments. FIGS. 5B, 6B, 7B, 8B, and 9B are cross-sectional views of the corresponding parts of the display device of FIGS. 5A, 6A, 7A, 8A, and 9A taken along respective sectional lines I-I'. FIGS. 10A, 11A, 12A, 13A, 14A, 15A, 16A, 17A, and 18A are cross-sectional views of the display device of FIG. 9 taken along sectional line II-IF at various additional stages of manufacture, according to exemplary embodiments. FIGS. 10B, 11B, 12B, 13B, 14B, 15B, 16B, 17B, and 18B are cross-sectional views of the display device of FIG. 9A taken along sectional line III-III' at various additional stages of manufacture, according to exemplary embodiments.

Figure 5A:
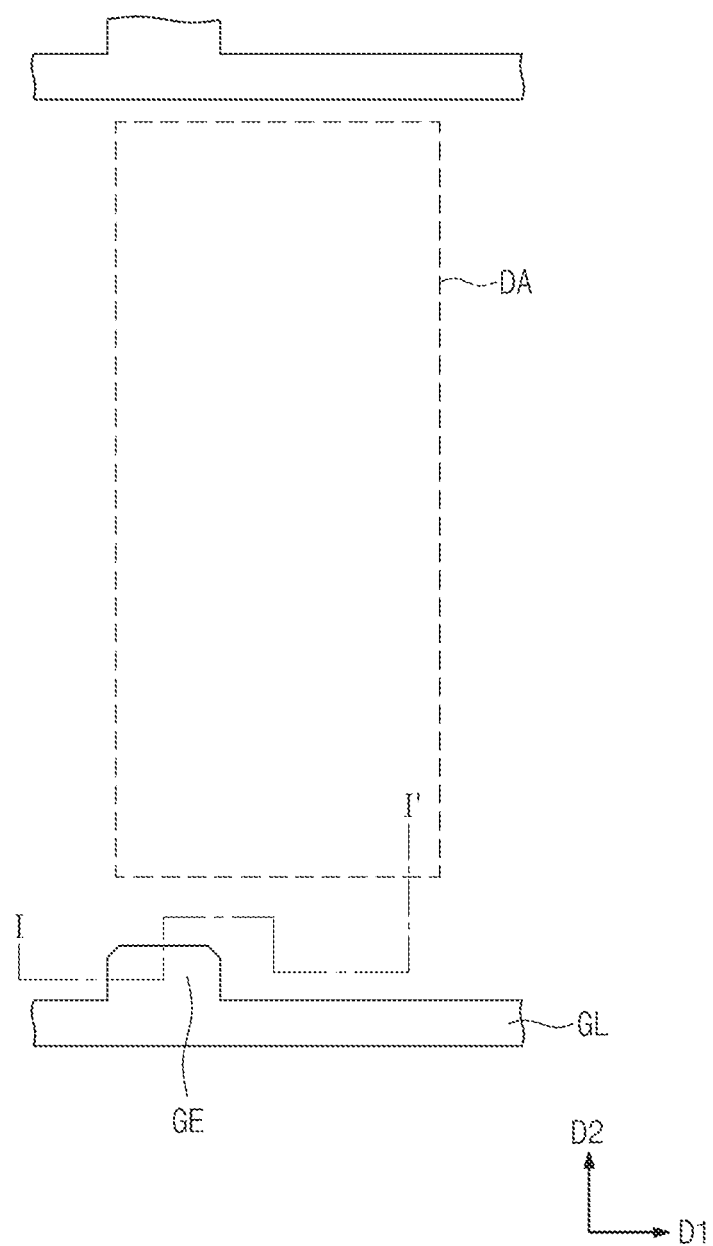
FIGS. 5A, 6A, 7A, 8A, and 9A are plan views of parts of a display device at various stages of manufacture, according to exemplary embodiments.
Figure 5B:
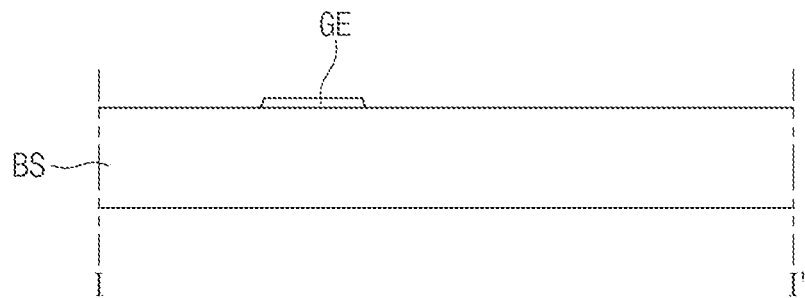
FIGS. 5B, 6B, 7B, 8B, and 9B are cross-sectional views of the corresponding parts of the display device of FIGS. 5A, 6A, 7A, 8A, and 9A taken along respective sectional lines I-I', according to exemplary embodiments.

Referring to FIGS. 5A and 5B, a gate line part is formed on the base substrate BS. The gate line part includes the gate line GL and the gate electrode GE.

The gate line part is formed of a conductive material, e.g., a metal material. The gate line part is formed by forming a metal layer over the base substrate BS and patterning the metal layer using, for instance, one or more photolithography processes. The gate line part may have a single-layer structure of a single metal or a metal alloy, but it is also contemplated that multi-layer and/or multi-metal structures may be utilized. That is, the gate line part may have a multi-layer structure of two or more metals and/or an alloy thereof.

Figure 6A:
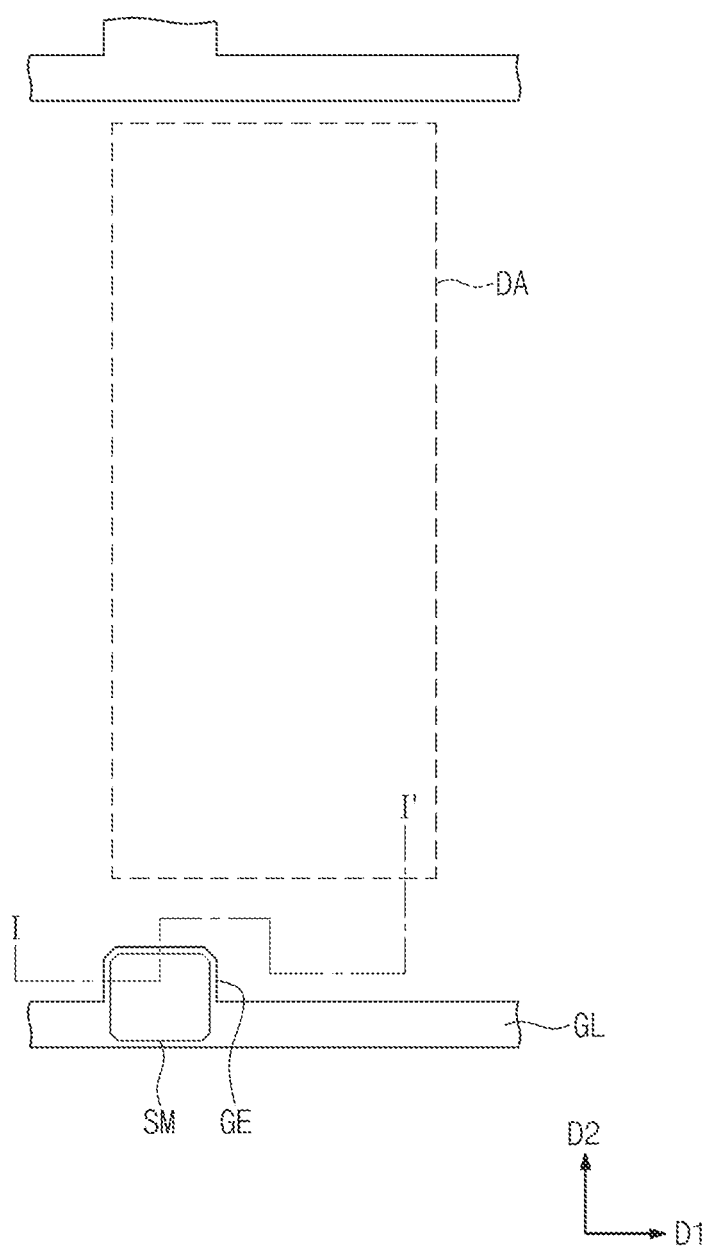
Figure 6B:
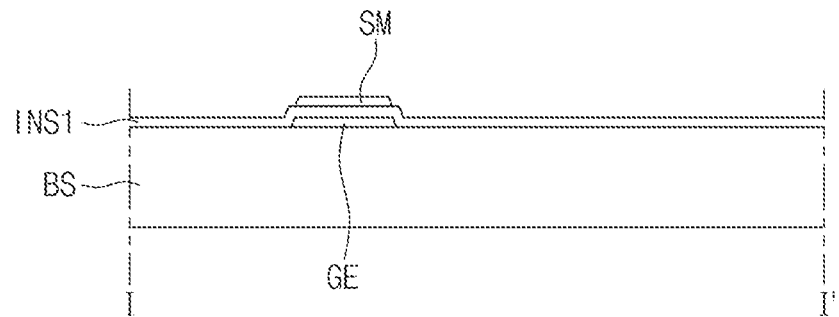

Referring to FIGS. 6A and 6B, the first insulating layer INS1 is formed on the gate line part and the semiconductor layer SM is formed on the first insulating layer INS1. The semiconductor layer SM is disposed above the gate electrode GE and overlaps at least a portion of the gate electrode GE when viewed in a plan view. The semiconductor layer SM may include silicon, oxide, etc., semiconductor, which is doped or non-doped.

Figure 7A:
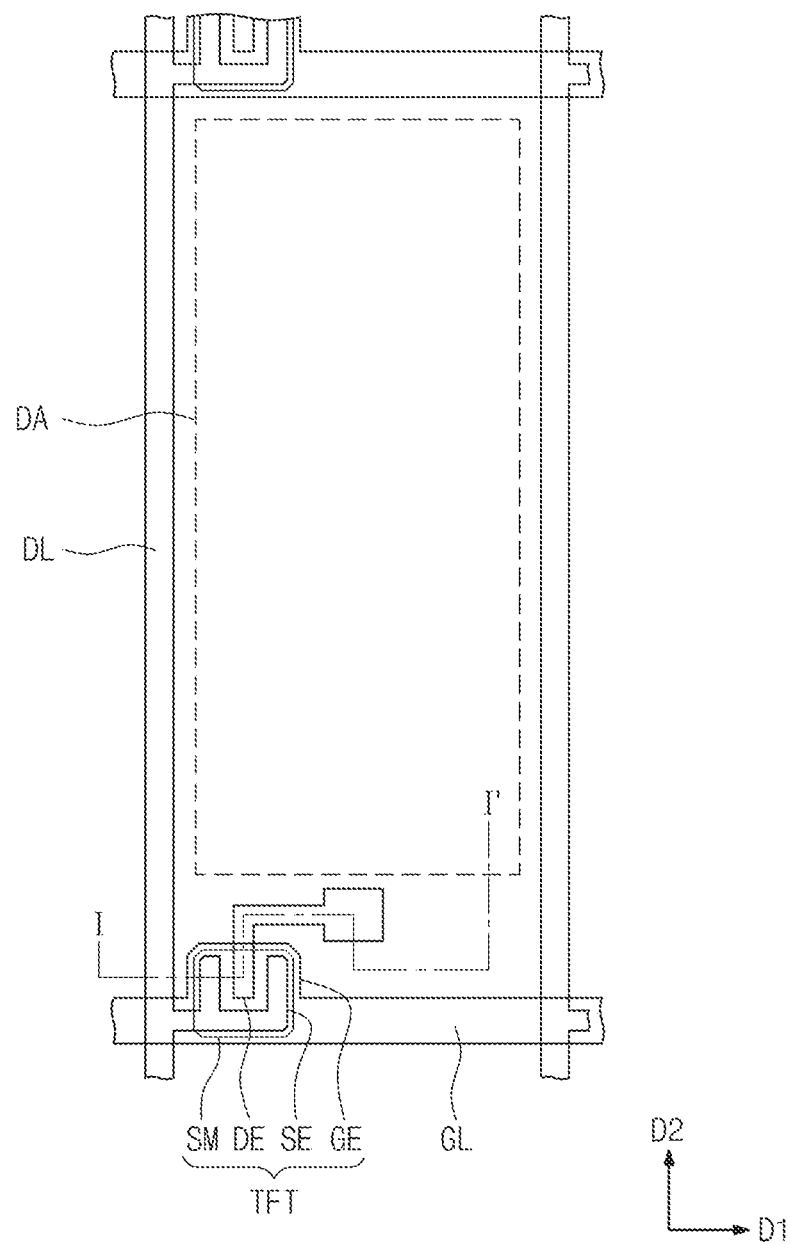
Figure 7B:
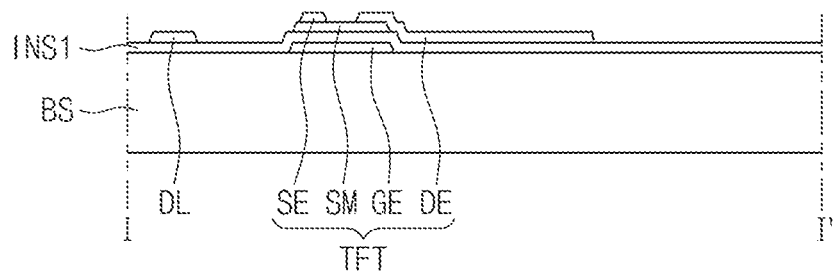

Referring to FIGS. 7A and 7B, a data line part is formed on the semiconductor layer SM. The data line part includes the data line DL, the source electrode SE, and the drain electrode DE.

The data line part is formed of a conductive material, e.g., a metal material. For instance, the data line part is formed by forming a metal layer over the base substrate BS and patterning the metal layer using, for example, one or more photolithography processes. The data line part may have a single-layer structure of a single metal or a metal alloy, but it is also contemplated that multi-layer and/or multi-metal structures may be utilized. That is, the data line part may have a multi-layer structure of two or more metals and/or an alloy thereof.

The gate electrode GE, the source electrode SE, the drain electrode DE, and the semiconductor layer SM form the thin film transistor TFT (S110).

Figure 8A:
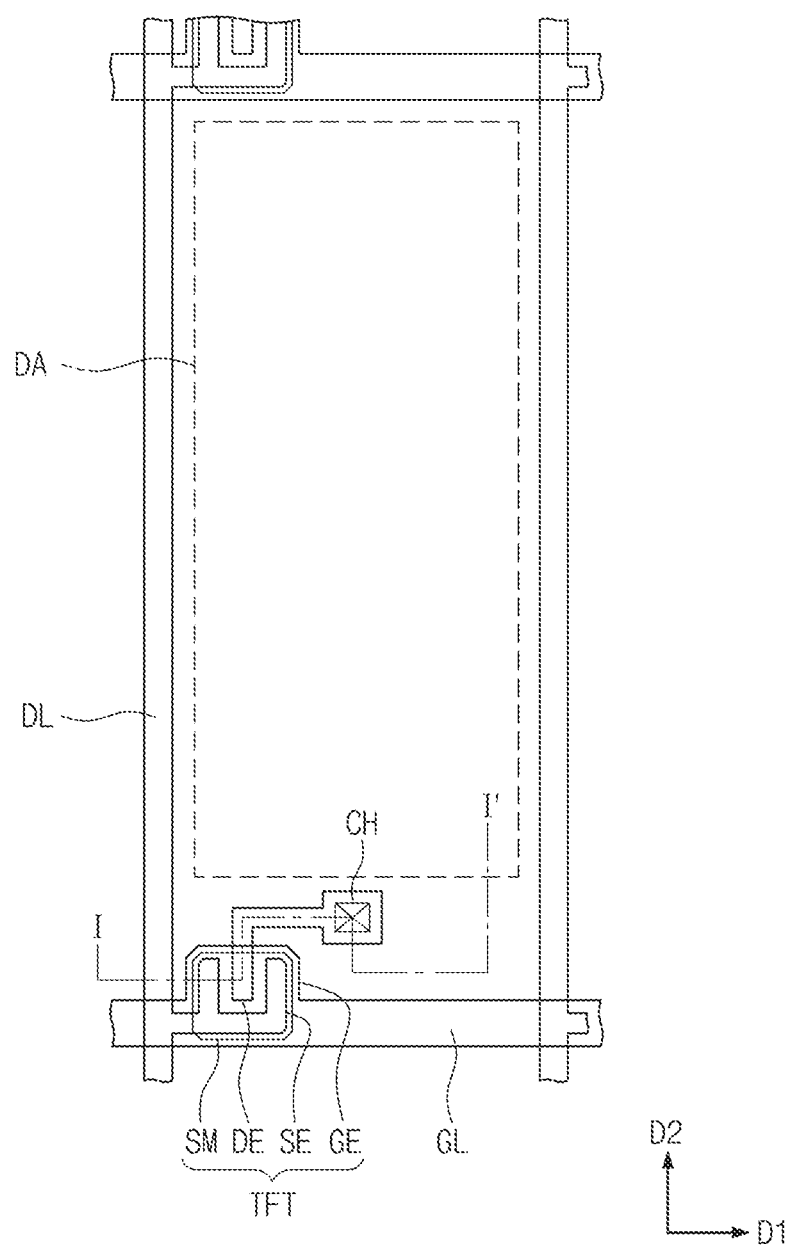
Figure 8B:
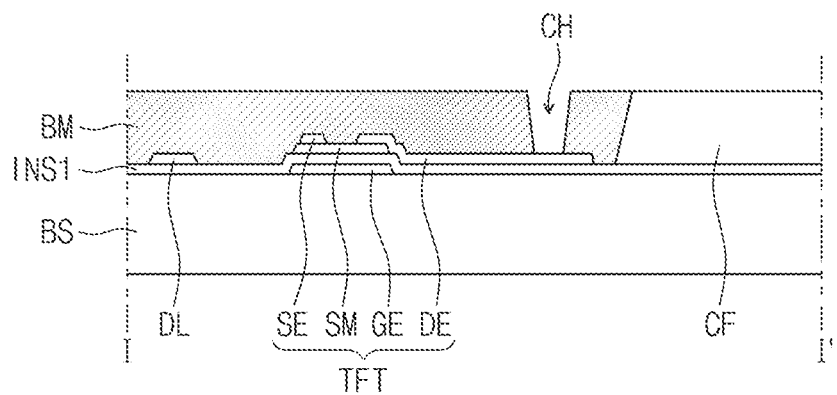

Referring to FIGS. 8A and 8B, the color filters CF and the black matrix BM are formed on the base substrate BS in a region including the data line part (S120). The contact hole CH is formed to expose a portion of the drain electrode DE.

The color filters CF are formed by forming color layers, which respectively represent, for instance, red, green, blue, or others, on the base substrate BS. The color filters CF are patterned using, for instance, one or more photolithography processes. It is noted, however, that the process of forming the color filters CF is not limited to photolithography process(es). That is, the color filters CF may be formed by using an inkjet method or any other one or more suitable fabrication techniques. The black matrix BM is formed by forming a light blocking layer (that is configured to absorb light) on the base substrate BS, and patterning the light blocking layer using, for instance, one or more photolithography processes. The process of forming the black matrix BM; however, is not limited to the photolithography process(es). That is, the black matrix BM may be formed via an inkjet method or any other suitable fabrication technique(s). It is also contemplated that the red, green, and blue color layers may be formed after the black matrix BM is formed. In addition, the order of forming the color layers may be changed.

The contact hole CH is formed by partially patterning the first insulating layer INS1 and the black matrix BM using, for instance, one or more photolithography processes.

Although not shown in figures, an additional insulating layer, e.g., a passivation layer, may be disposed between the thin film transistor TFT and the color filter CF part. As previously mentioned, the additional insulating layer may be configured to protect the channel of the thin film transistor TFT, as well as configured to prevent foreign substances from the color filter CF part from infiltrating the thin film transistor TFT.

Figure 9A:
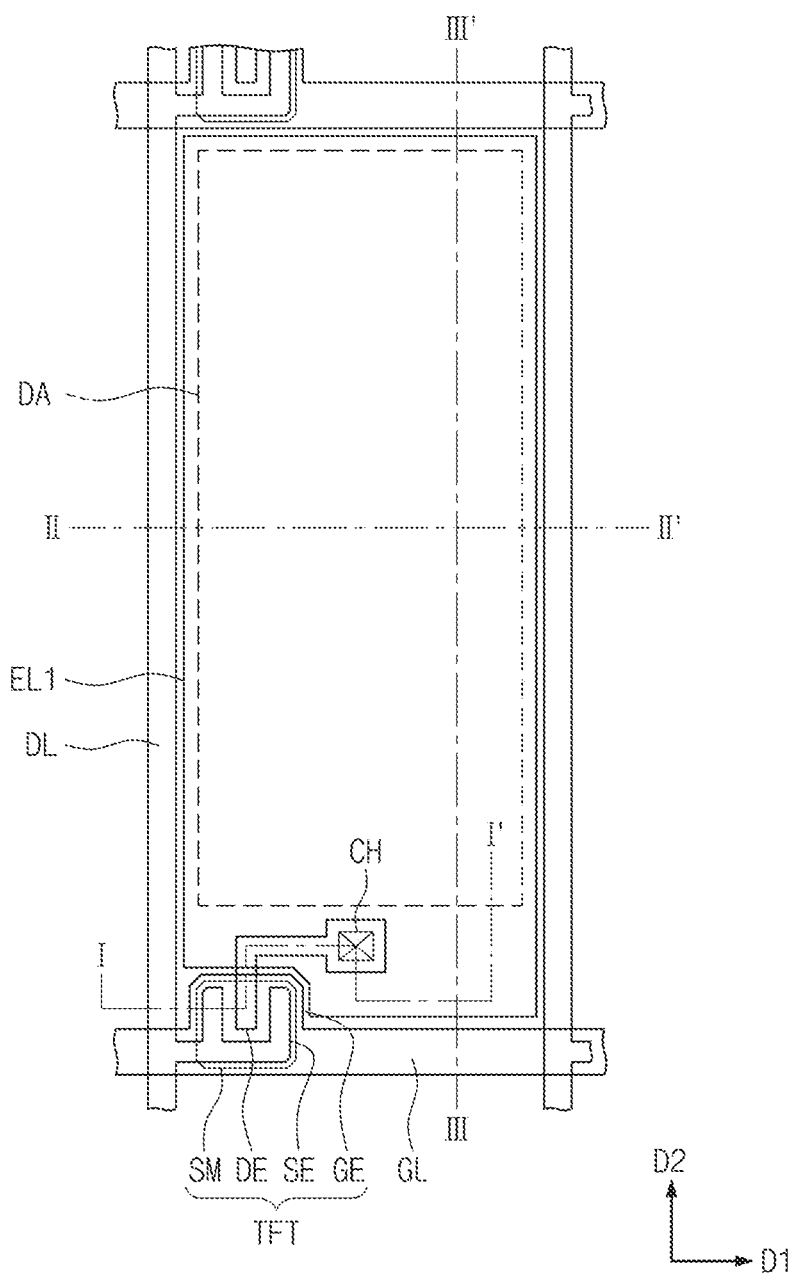
Figure 9B:
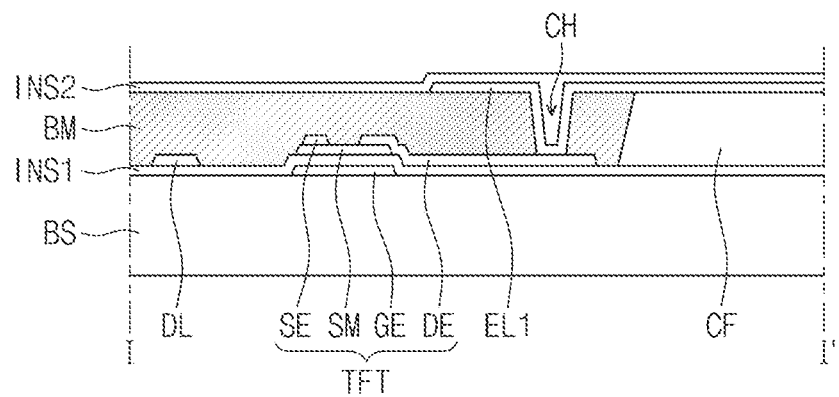

Referring to FIGS. 9A and 9B, the first electrode EL1 is formed on the color filter part (S130).

The first electrode EL1 is formed by forming a conductive layer using a conductive material on the color filter part and patterning the conductive layer using, for instance, one or more photolithography processes. The first electrode EL1 is connected to the drain electrode DE via the contact hole CH.

The second insulating layer INK is formed on the first electrode EL1 to protect the first electrode EL1.

Figure 10A:
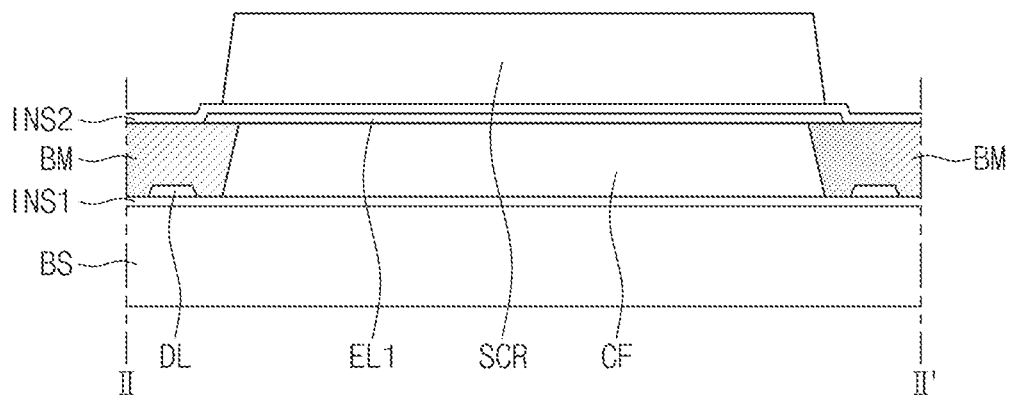
FIGS. 10A, 11A, 12A, 13A, 14A, 15A, 16A, 17A, and 18A are cross-sectional views of the display device of FIG. 9 taken along sectional line II-II' at various additional stages of manufacture, according to exemplary embodiments.
Figure 10B:
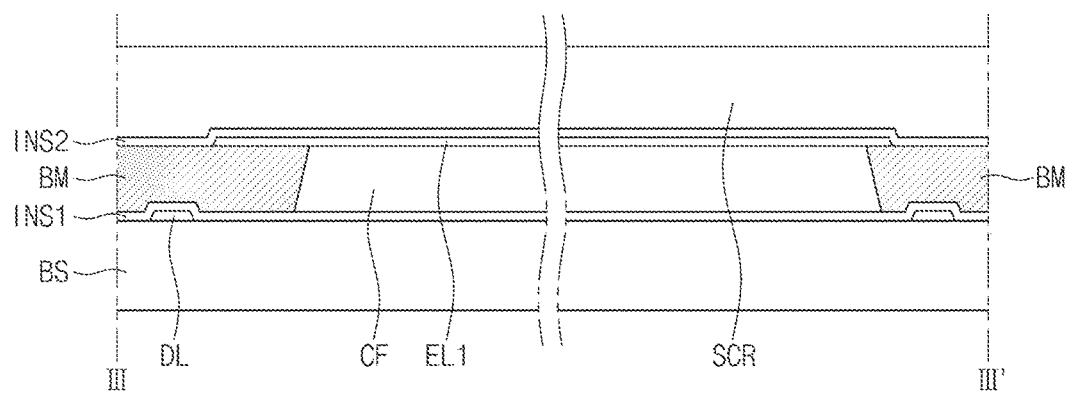
FIGS. 10B, 11B, 12B, 13B, 14B, 15B, 16B, 17B, and 18B are cross-sectional views of the display device of FIG. 9 taken along sectional line III-III' at various additional stages of manufacture, according to exemplary embodiments.

Referring to FIGS. 10A and 10B, the sacrificial layer SCR is formed on the second insulating layer INS2 (S140). For instance, the sacrificial layer SCR is formed on the second insulating layer INS2 in a region corresponding to the tunnel-shaped cavity TSC.

The sacrificial layer SCR covers the display area DA and is extended in the second direction D2. That is, when the pixels PX are arranged in the first direction D1 as a row direction and the second direction D2 as a column direction, the sacrificial layer SCR has a bar shape elongated in the column direction, i.e., the second direction D2. However, the direction in which the sacrificial layer SCR is extended is not limited to the second direction D2, and thus, the sacrificial layer SCR may be extended in the first direction D1 or any other suitable direction.

As will become more apparent below, the sacrificial layer SCR is removed later to define the tunnel-shaped cavity TSC. As such, the sacrificial layer SCR may be formed having a width and height respectively corresponding to those of the tunnel-shaped cavity TSC. Further, the sacrificial layer SCR is formed in an area in which the liquid crystal layer LC is later formed/disposed.

Figure 11A:
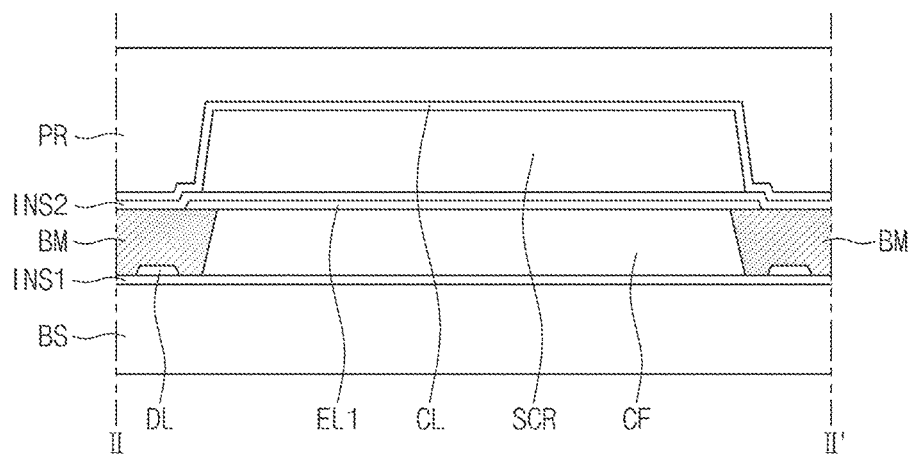
Figure 11B:
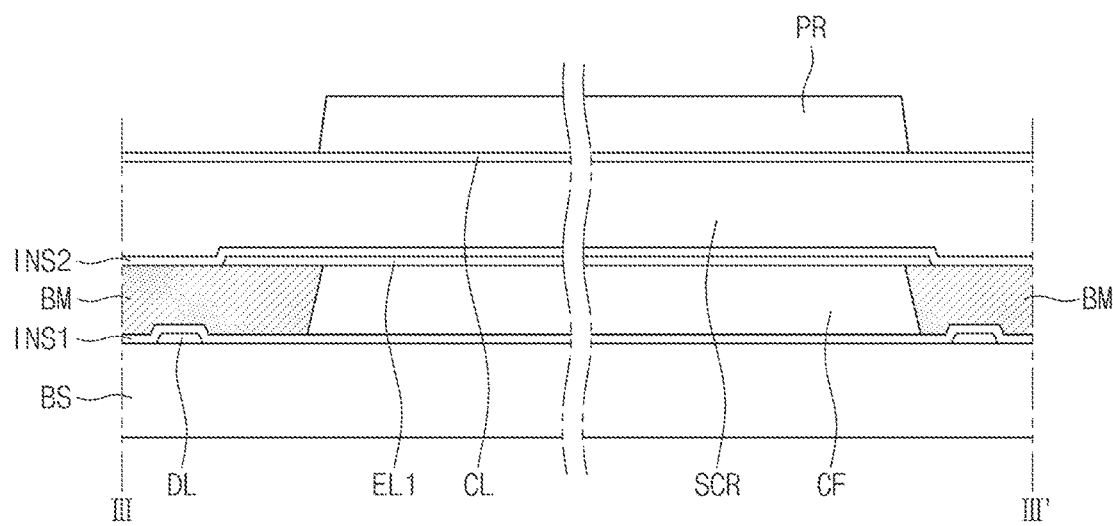

Referring to FIGS. 11A and 11B, a conductive layer CL is formed on the sacrificial layer SCR and a photoresist pattern PR is formed on the conductive layer CL.

The conductive layer is a transparent conductive material, e.g., indium tin oxide, indium zinc oxide, etc., and is formed by using, for instance, one or more physical vapor deposition techniques. It is contemplated; however, that any alternative and/or additional fabrication techniques may be utilized.

The photoresist pattern PR is formed in an area in which the second electrode EL2 is formed. The photoresist pattern PR is formed by coating photoresist on the conductive layer, exposing the photoresist, and developing the exposed photoresist.

Figure 12A:
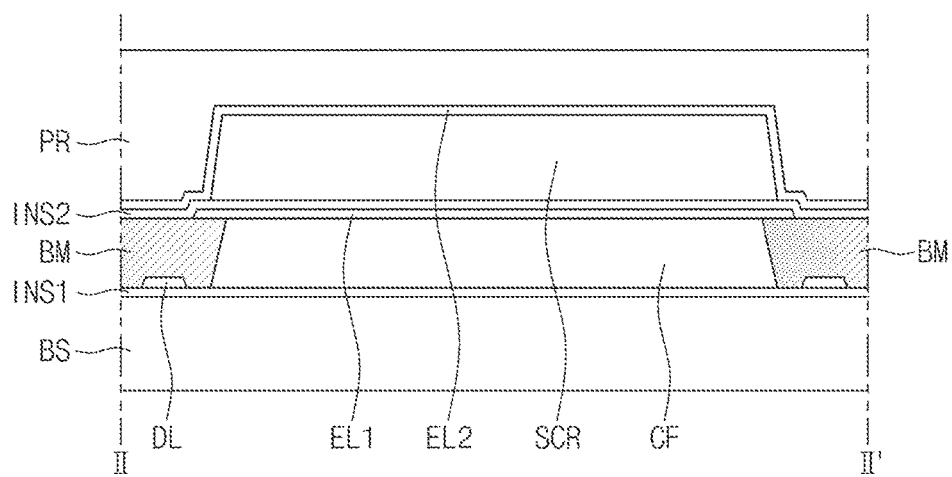
Figure 12B:
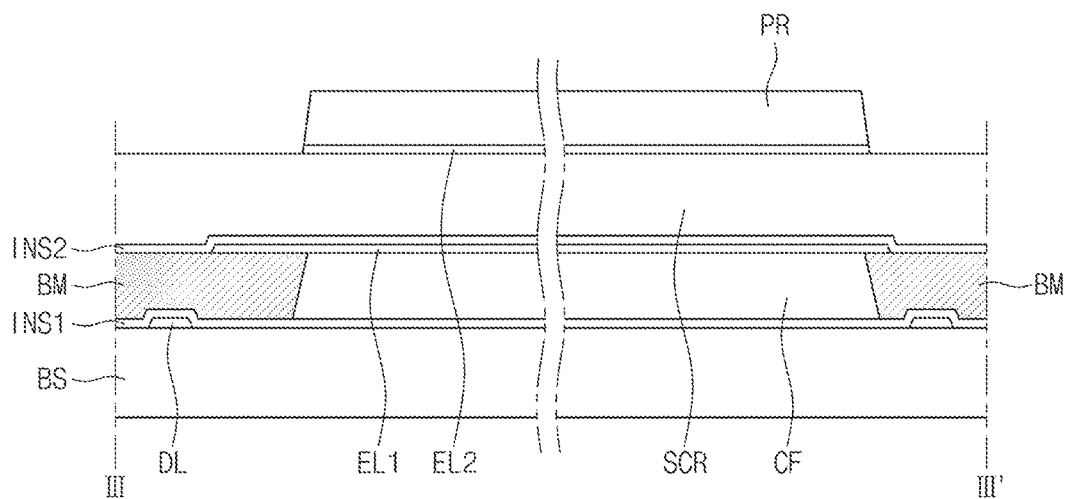

Referring to FIGS. 12A and 12B, the second electrode EL2 is formed on the sacrificial layer SCR (S150). The second electrode EL2 is formed by etching the conductive layer using the photoresist pattern PR as a mask.

Figure 13A:
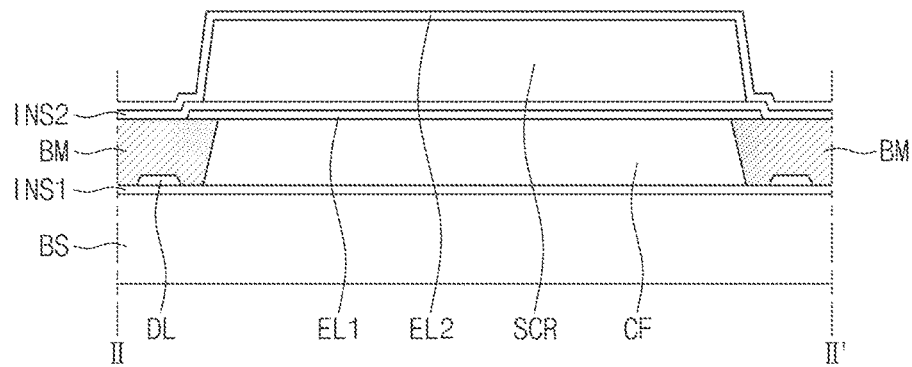
Figure 13B:
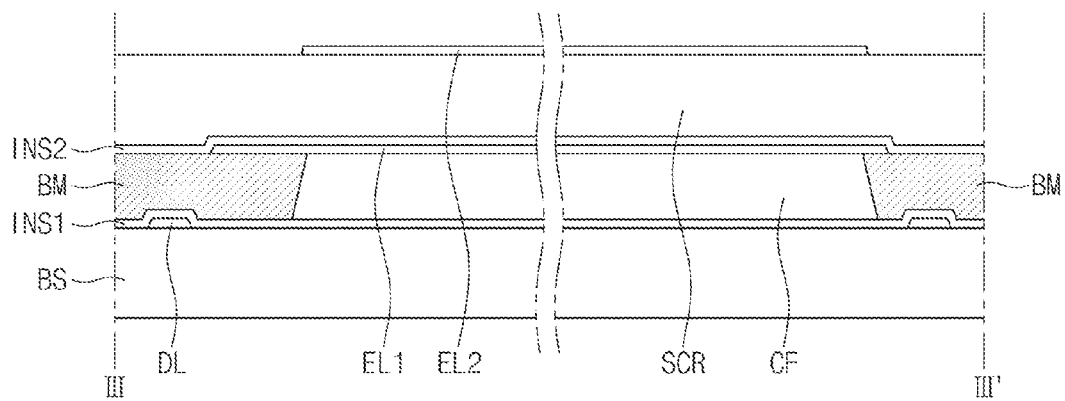

Referring to FIGS. 13A and 13B, the photoresist pattern PR is removed.

Figure 14A:
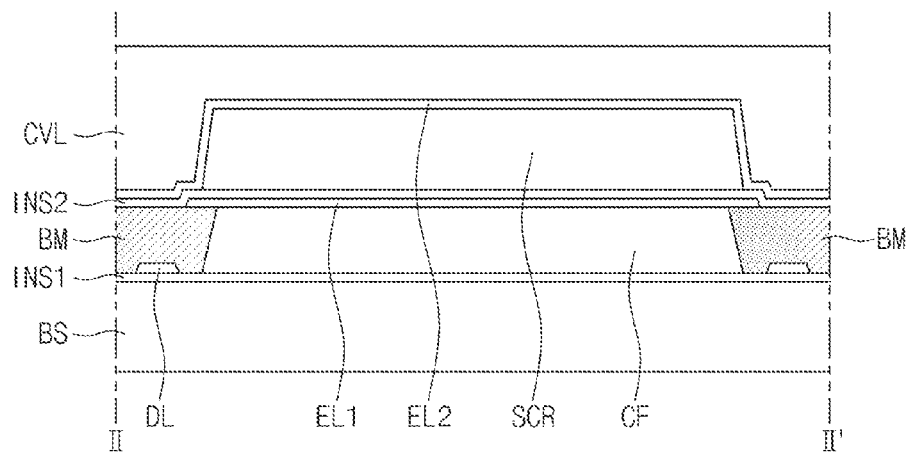
Figure 14B:
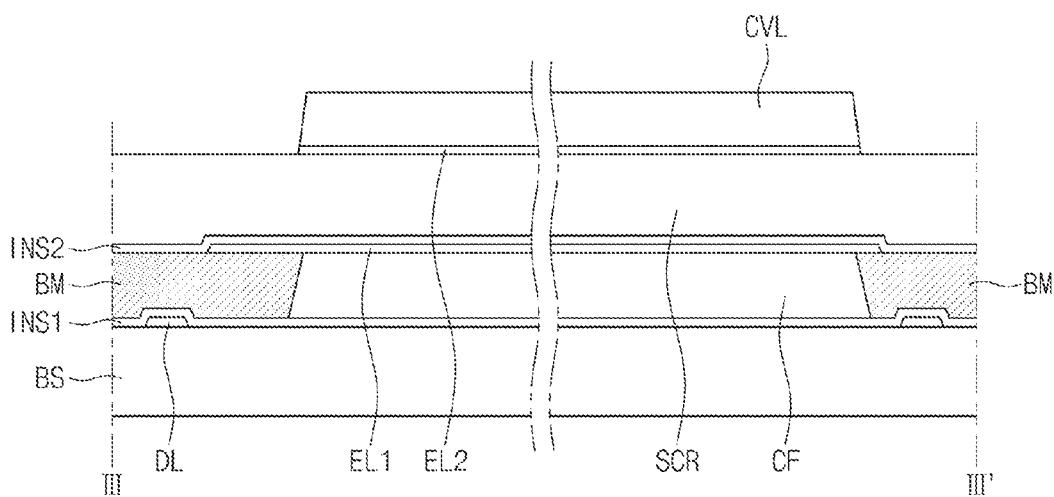

Referring to FIGS. 14A and 14B, the cover layer CVL is formed on the base substrate BS in a region corresponding to the second electrode EL2 (S160). The cover layer CVL is extended in the first direction D1 and covers the second electrode EL2.

According to exemplary embodiments, the second electrode EL2 and the cover layer CVL overlap each other when viewed in a plan view and have the same surface shape. It is noted, however, that in consideration of various design margins, the cover layer CVL may have an area wider than that of the second electrode EL2 so as to completely cover the second electrode EL2. It is also noted that the cover layer CVL is not formed in the end portions in the second direction D2 of the display area DA. That is, in the end portions extending parallel (or substantially parallel) to the data line. Accordingly, the upper surface of the sacrificial layer SCR is exposed in the end portions in the second direction D2 of the display area DA.

Figure 15A:
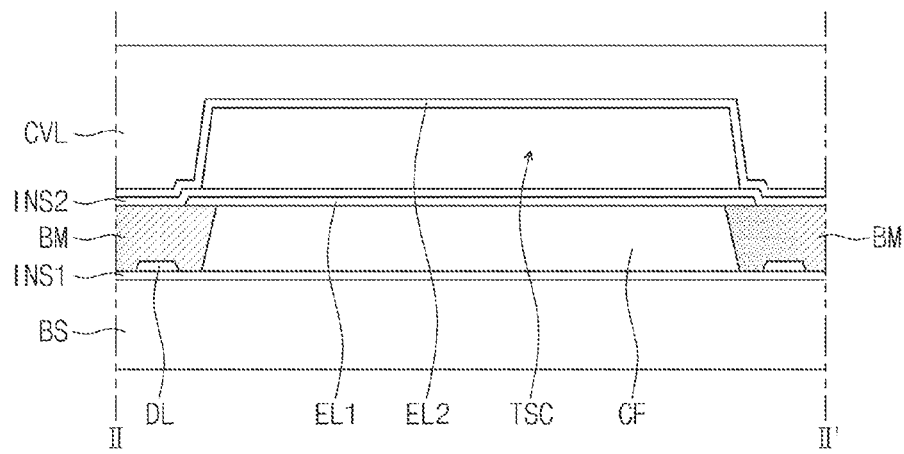
Figure 15B:
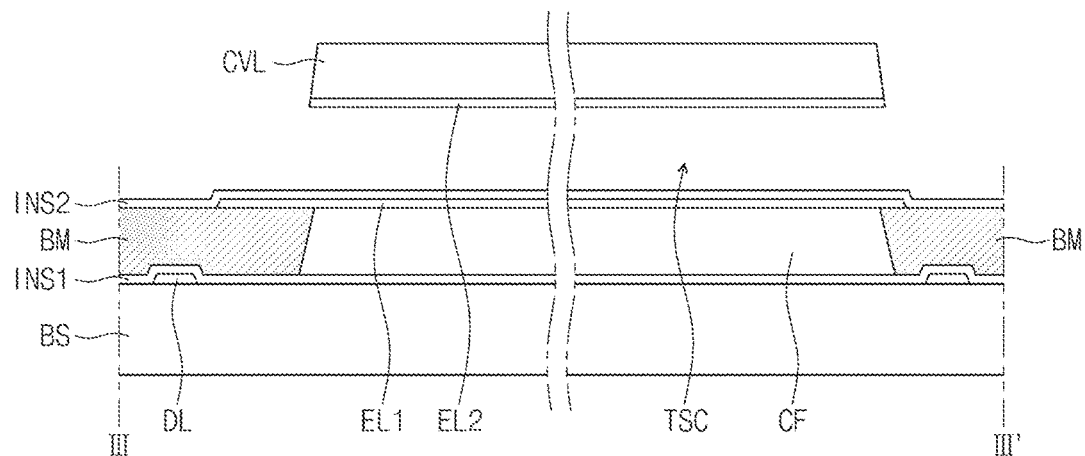

Referring to FIGS. 15A and 15B, the sacrificial layer SCR is removed through one or more dry etching processes and/or one or more wet etching processes to form the tunnel-shaped cavity TSC (S170). The dry etching process(es) may be performed using plasma and the wet etching process(es) may be performed using various etchants selected in consideration of the material(s) used to form the sacrificial layer SCR. The sacrificial layer SCR is etched from the upper portion thereof. Thus, the upper surface of the second insulating layer INK and the lower surface of the second electrode EL2, which correspond to the display area DA, are exposed, and the tunnel-shaped cavity TSC is defined by the upper surface of the second insulating layer INK, the lower surface of the second electrode EL2, and the both end portions in the second direction D2 of the display area DA.

The inorganic insulating layer (e.g., the second insulation layer INS2) may be formed on the sacrificial layer SCR before the second electrode EL2 is formed. In addition, the additional inorganic insulating layer (not illustrated) may be formed on the second electrode EL2 before the cover layer CVL is formed. The additional inorganic insulating layer is configured to support the cover layer CVL and, thereby, to allow the cover layer CVL to stably maintain the tunnel-shaped cavity TSC when the sacrificial layer SCR is etched.

Figure 16A:
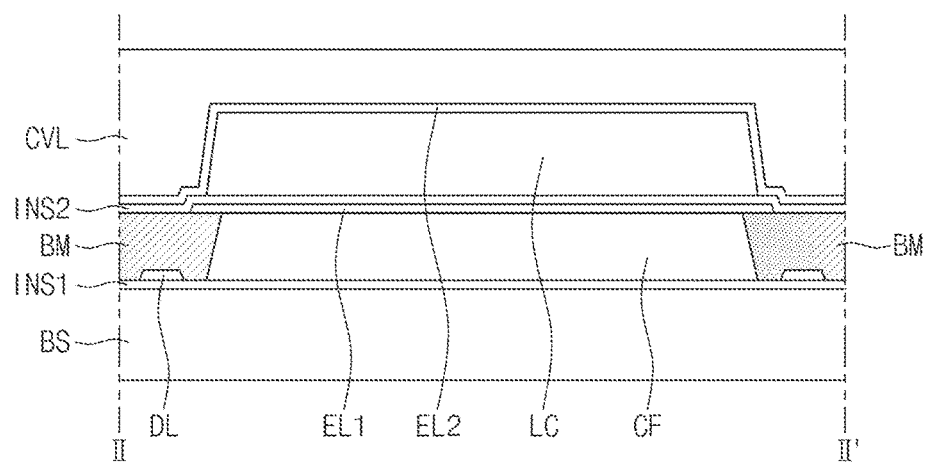
Figure 16B:
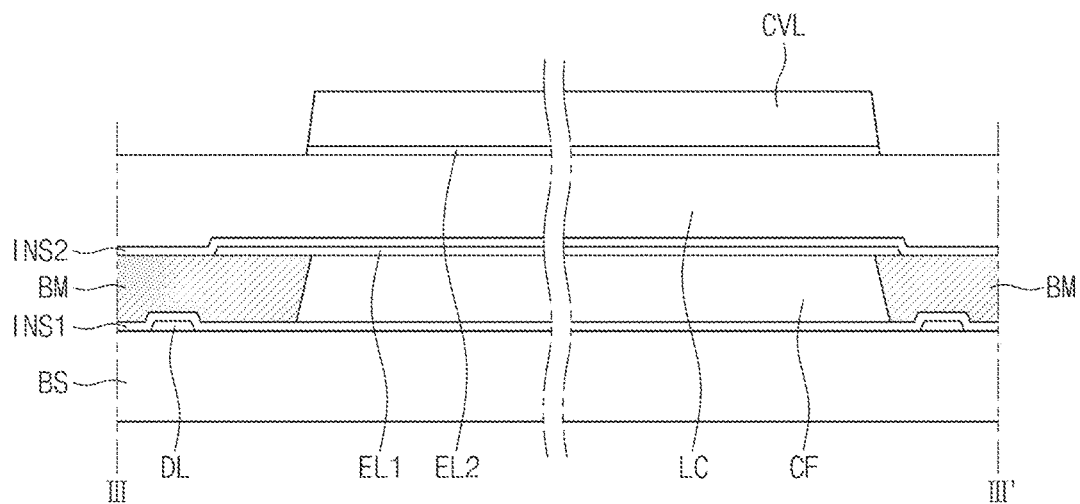

Referring to FIGS. 16A and 16B, the liquid crystal layer LC is formed in the tunnel-shaped cavity TSC (S180). According to exemplary embodiments, the liquid crystal molecules are provided as a fluid. As such, the liquid crystal molecules will move into the tunnel-shaped cavity TSC by a capillary tube phenomenon when the liquid crystal molecules are provided at (or close) to an opening of the tunnel-shaped cavity TSC. The liquid crystal molecules may be provided at (or close) to the tunnel-shaped cavity TSC using an inkjet device employing, for instance, a micropipette. As a result, the liquid crystal layer LC is provided in the tunnel-shaped cavity TSC, as well as between adjacent tunnel-shaped cavities TSC.

According to exemplary embodiments, the liquid crystal layer LC may be provided into the tunnel-shaped cavity TSC using a vacuum liquid crystal injection device. To this end, a portion of the base substrate BS in which the tunnel-shaped cavity TSC is formed is dipped into a vessel in a chamber, in which a liquid crystal material is filled, and a pressure of the chamber is lowered. As a result, the liquid crystal material is received in the tunnel-shaped cavity TSC by the capillary tube phenomenon.

Figure 17A:
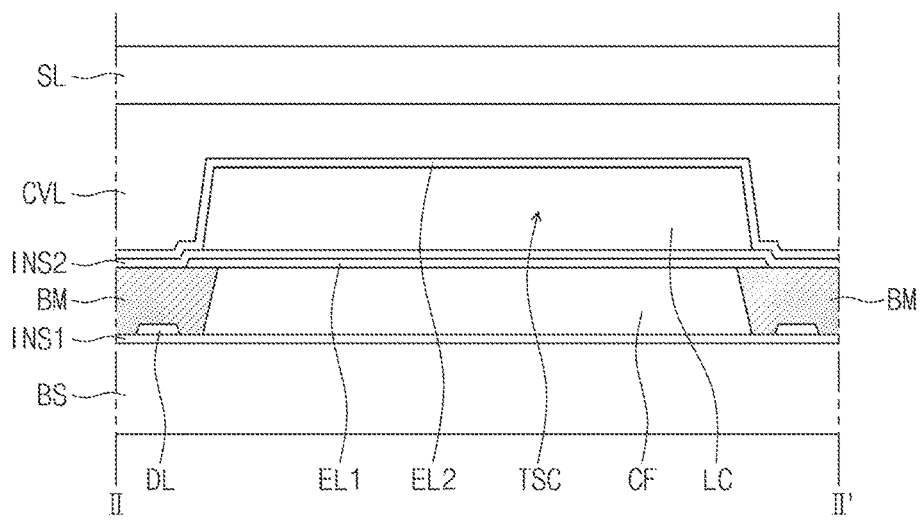
Figure 17B:
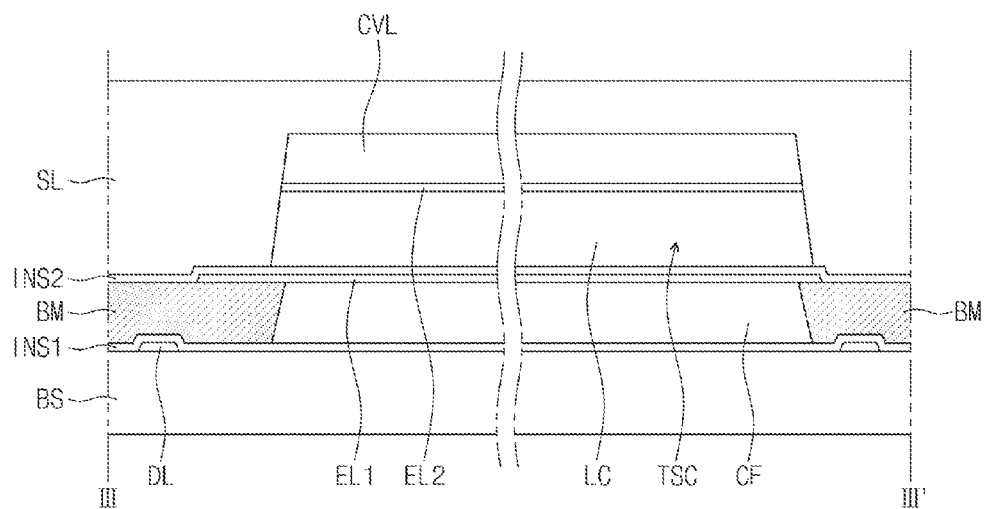

Referring to FIGS. 17A and 17B, the portion of the liquid crystal layer LC that is disposed in the area except for the tunnel-shaped cavity TSC is removed, and the sealant layer SL is formed to surround the tunnel-shaped cavity TSC (S190). The sealant layer SL is configured to block the opening of the tunnel-shaped cavity TSC, i.e., block an inlet through which the liquid crystal molecules are injected by the capillary tube phenomenon.

The sealant layer SL may include an organic polymer. The organic polymer is not limited to any specific organic polymer, as long as the sealant layer SL seals the tunnel-shaped cavity TSC via a vacuum deposition processes. As an example, the organic polymer may be poly(p-xylene)polymer, i.e., parylene. In detail, the organic polymer may be parylene-N, parylene-C, or parylene-HT. An exemplary process to form the sealant layer SL using parylene-N will be described as an example. It is noted that forming the sealant layer SL using parylene-C or parylene-HT is the same as the process of forming the sealant layer SL using parylene-N and, therefore, only the parylene-N example is described to avoid obscuring exemplary embodiments described herein.

First, a parylene polymer is provided according to the following formula 4.

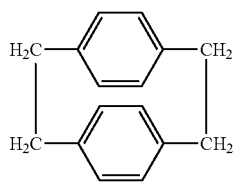

Formula 4

The parylene polymer is evaporated at a first temperature. The first temperature may range from about 150° C. to about 200° C., e.g., from about 150° C. to about 180° C.

The parylene polymer is changed to a parylene monomer at a second temperature higher than the first temperature. A parylene radical is generated in the process of changing the parylene polymer to the parylene monomer, and the parylene radical acts as an initiator in a polymerization reaction. The second temperature may range from about 650° C. to about 680° C., e.g., from about 650° C. to about 670° C.

The parylene monomer is deposited on the base substrate BS in a vacuum chamber at an "ordinary" temperature, e.g., a temperature from about 20° C. to about 25° C. The parylene monomer is polymerized on the base substrate BS to form the sealant layer SL. When assuming that a pressure required to inject the liquid crystal molecules into the tunnel-shaped cavity TSC is a first pressure, and a pressure in the vacuum chamber is a second pressure, the second pressure is lower than the first pressure. The second pressure may be about 1 mTorr to about 300 mTorr.

When the organic polymer is vacuum deposited, movement of the liquid crystal molecules of the liquid crystal layer LC may occur due to the pressure difference between the pressure in the tunnel-shaped cavity TSC and the pressure outside of the tunnel-shaped cavity TSC, i.e., the pressure in the vacuum chamber. As such, the liquid crystal molecules of the liquid crystal layer LC will flow into the opening of the tunnel-shaped cavity TSC, in which the pressure is relatively lower, and thus, the liquid crystal molecules of the liquid crystal layer LC will be aligned in the flow direction.

Figure 18A:
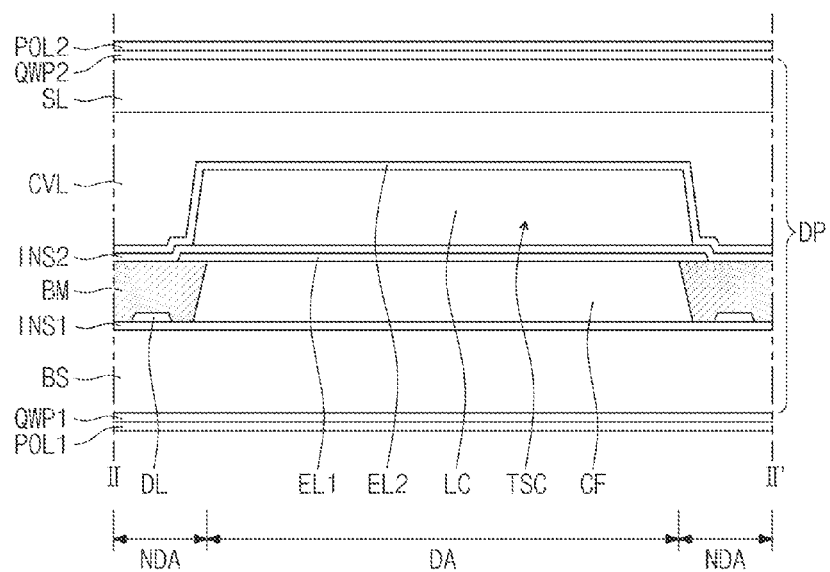
Figure 18B:
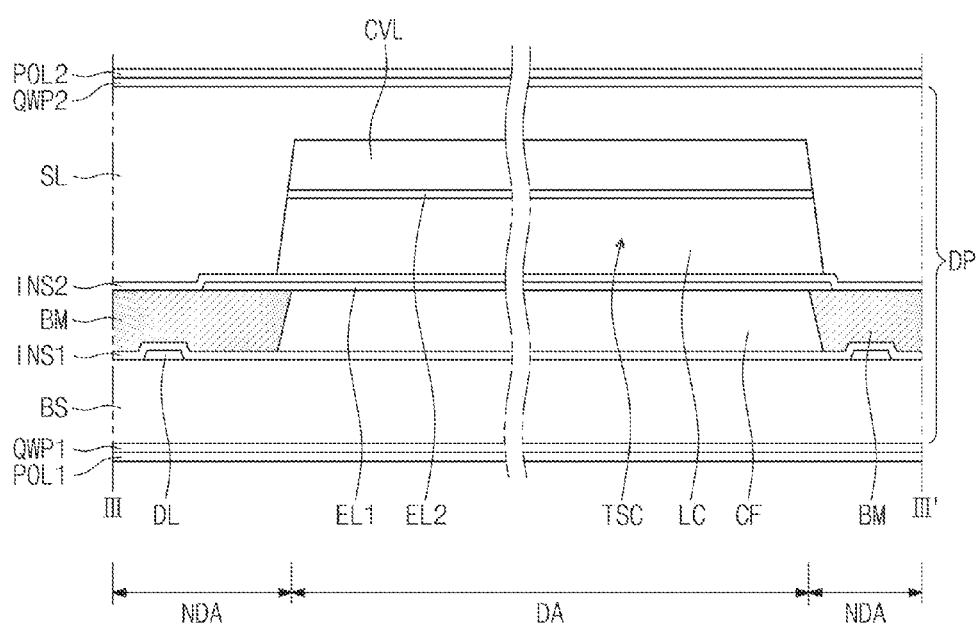

Referring to FIGS. 18A and 18B, the optical member(s) are formed and/or attached to the display panel DP (S200). The optical member(s) may include the first and second quarter wave plates QWP1 and QWP2 and first and second polarization plates POL1 and POL2. As previously mentioned; however, one or more of the first and second quarter wave plates QWP1 and QWP2 and/or the first and second polarization plates POL1 and POL2 may be omitted and/or additional (or alternative) layers/plates may be utilized.

The attachment of the optical member(S) may be performed by placing the first quarter wave plate QWP1 and the second quarter wave plate QWP2 on the lower and upper surfaces of the display panel DP, respectively, and placing the first polarization plate POL1 and the second polarization plate POL2 on the first and second quarter wave plates QWP1 and QWP2, respectively. The first and second quarter wave plates QWP1 and QWP2 and the first and second polarization plates POL1 and POL2 may be disposed outside the display panel DP without using adhesive, or may be attached to each other using adhesive to prevent the plates from being separated from each other.

Figure 19:
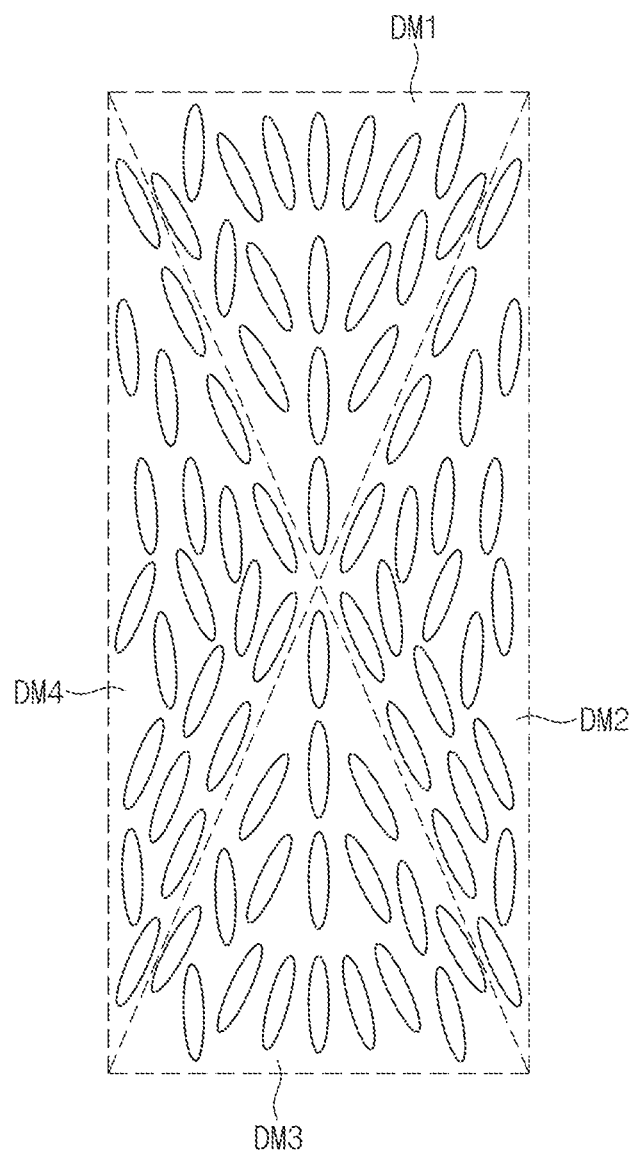
FIG. 19 is a plan view of liquid crystal molecules arranged in a flow direction, according to exemplary embodiments.
Figure 20:
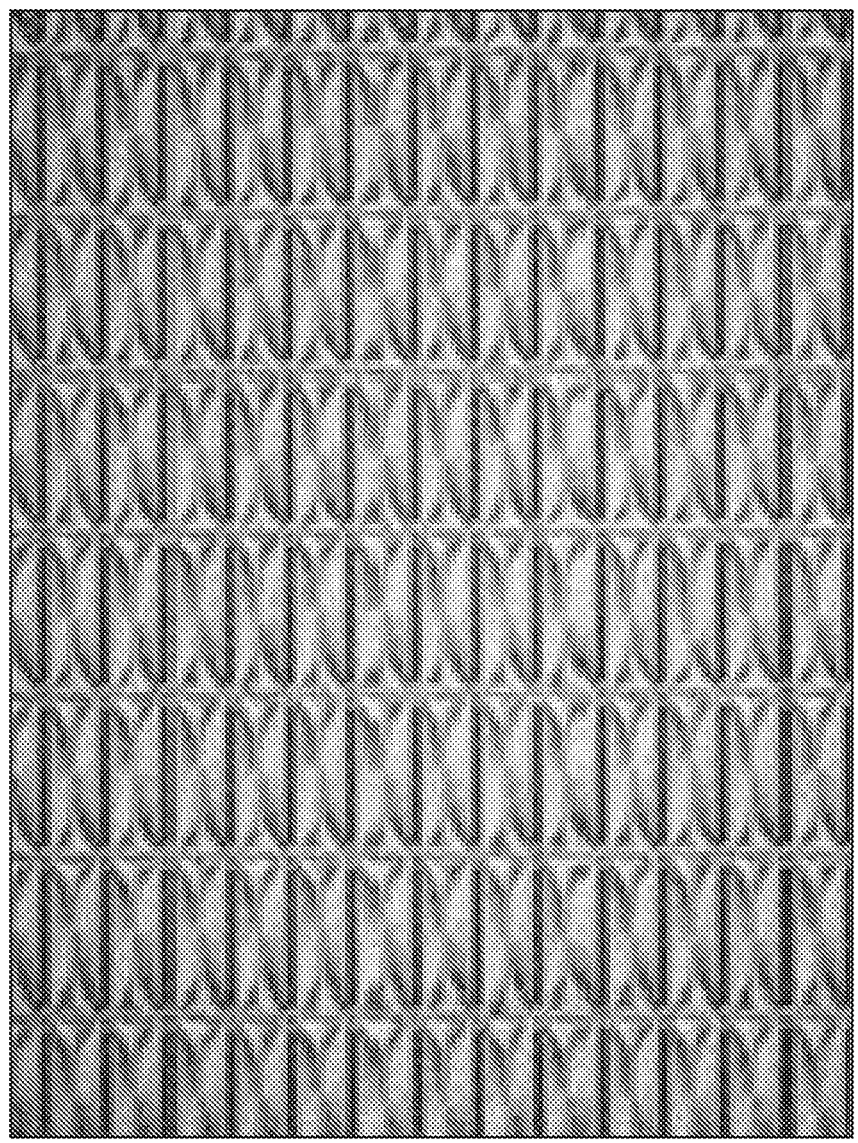
FIG. 20 is a photograph of a display device including first and second polarization plates disposed thereon and no source voltage applied to a display panel, according to exemplary embodiments.

FIG. 19 is a plan view of liquid crystal molecules arranged in a flow direction, according to exemplary embodiments. FIG. 20 is a photograph of a display device including first and second polarization plates disposed thereon and no source voltage applied to a display panel, according to exemplary embodiments.

Referring to FIGS. 19 and 20, the pixel PX has a rectangular shape with short sides and long sides, such that the tunnel-shaped cavity TSC is disposed in correspondence with the short sides. The liquid crystal molecules of the liquid crystal layer LC are arranged in a radial form in an area corresponding to the short sides, which is neighbor to the opening end portions of the tunnel-shaped cavity TSC. That is, the alignment of the liquid crystal molecules near the short ends of the rectangular shape varies along the short ends of the rectangular shape to converge (or diverge) from a central point in the rectangular shape. As such, the liquid crystal layer LC includes a plurality of alignment directions at least some of which radially extend from a central point of the rectangular shape. The liquid crystal molecules are arranged in a longitudinal direction along the long sides of the tunnel-shaped cavity TSC. Consequently, as shown in FIG. 19, the pixel PX is divided into the four domains DM1, DM2, DM3, and DM4 with reference to two diagonal lines, each of the diagonal lines connecting corresponding vertices of the rectangular shape, and an X-shaped brush texture (as seen in FIG. 20) is generated in correspondence with the boundaries between adjacent domains DM1, DM2, DM3, and DM4.

Figure 21A:
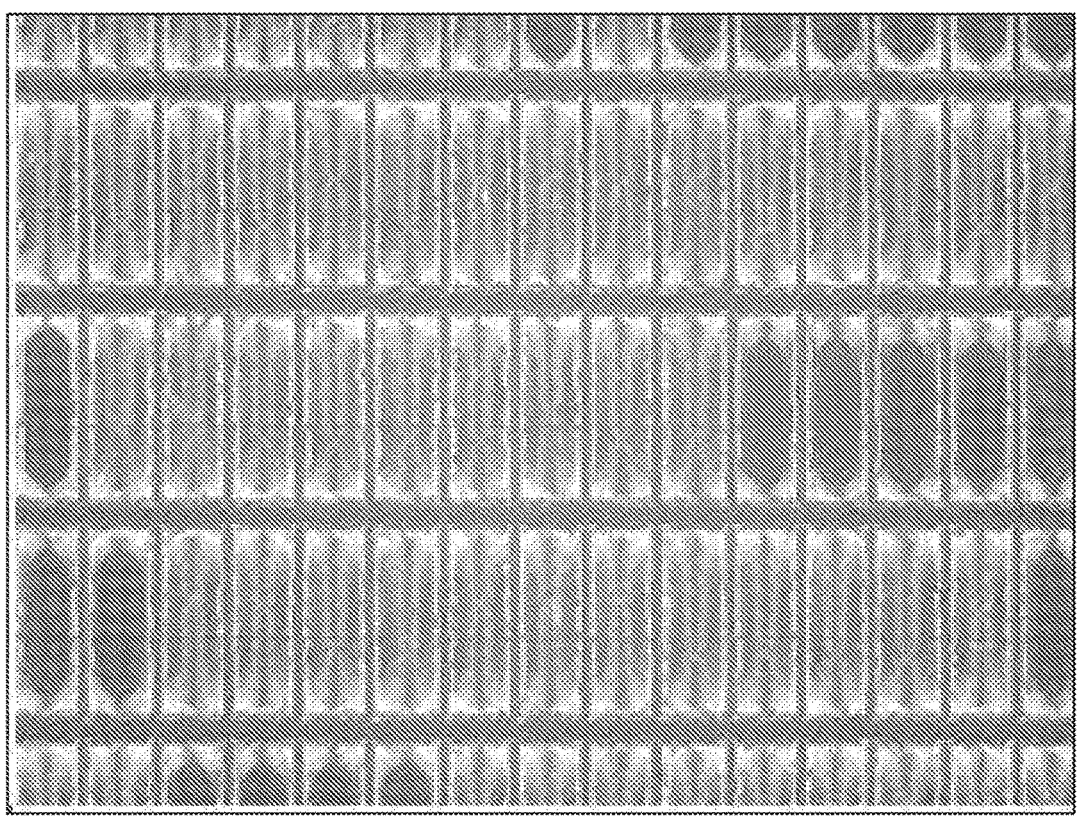
FIG. 21A is a photograph of a display device without first and second quarter wave plates, according to exemplary embodiments.
Figure 21B:
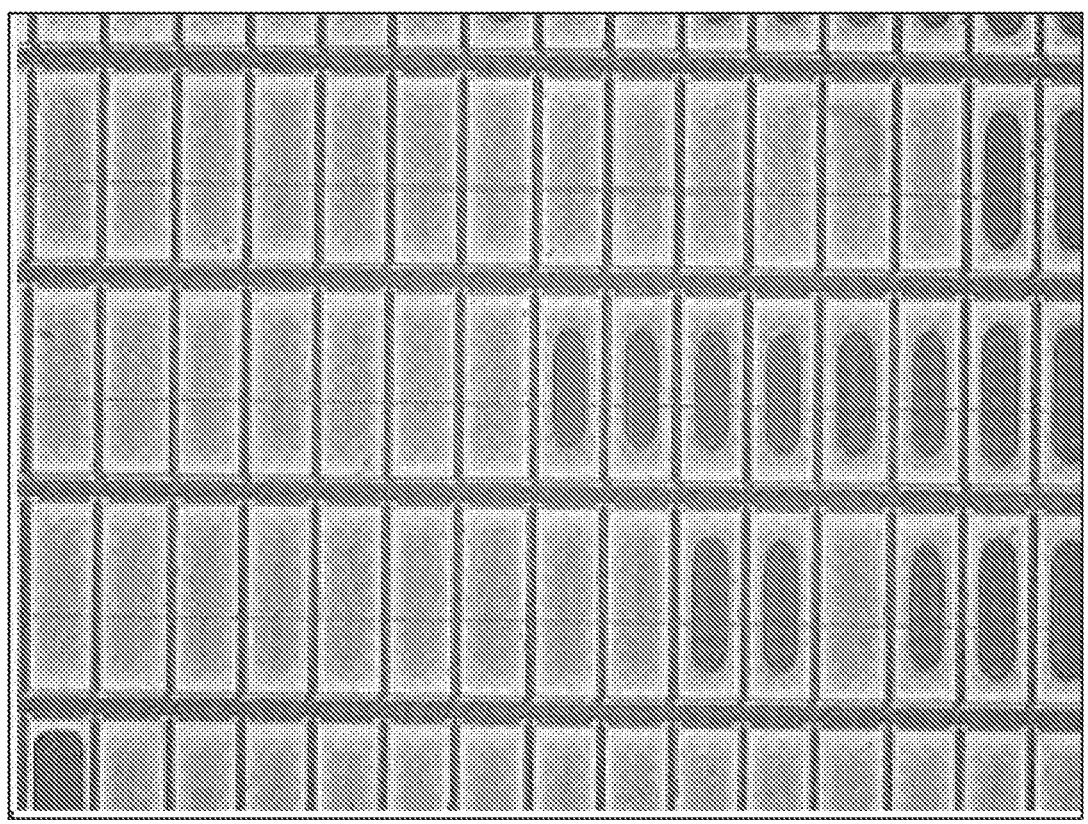
FIG. 21B is a photograph of a display device including first and second quarter wave plates, according to exemplary embodiments.

FIG. 21A is a photograph of a display device without first and second quarter wave plates, according to exemplary embodiments. FIG. 21B is a photograph of a display device including first and second quarter wave plates, according to exemplary embodiments.

Referring to FIG. 21A, when the first and second quarter wave plates QWP1 and QWP2 are not provided, the above-noted brush texture caused by the interfacing of domains DM1, DM2, DM3, and DM4 can be perceived by the viewer. When the first and second quarter wave plates QWP1 and QWP2 are provided, the brush texture is not perceived by the viewer, as shown in FIG. 21B.

According to exemplary embodiments, when a display device is manufactured as described above, a conventional process of attaching two opposing substrates to each other is omitted. In addition, the use of a second substrate and additional liquid crystal molecules between pixels PX is reduced. Thus, manufacturing time and cost may be noticeably reduced. In addition, according to exemplary embodiments, the liquid crystal molecules of the liquid crystal layer LC may be aligned in the predetermined directions of the tunnel-shaped cavity TSC to define a plurality of domains even though an alignment layer is not formed or otherwise provided. As such, the viewing angle of the display device is widened, but associated costs may be minimized.

According to exemplary embodiments, an additional alignment layer (not shown) may be formed while the liquid crystal molecules are aligned to define the above-noted domains (e.g., domains DM1, DM2, DM3, and DM4), that may improve the alignment effect. As such, the alignment layer may be formed by using an alignment solution before the liquid crystal layer LC is formed. The alignment solution may include a mixture of one or more alignment materials, e.g., polyimide, with solvent. Since the alignment solution is provided in a fluid, the alignment solution will also move into the tunnel-shaped cavity via the aforementioned capillary tube phenomenon when the alignment solution is provided at (or near) the opening to the tunnel-shaped cavity TSC. An inkjet device employing a micropipette may be utilized for this purpose or a vacuum injection device may be utilized. It is noted; however, that any other suitable technique may be utilized. The solvent is then removed via evaporation at room temperature or at an elevated temperature.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A display device, comprising:
   a substrate comprising a pixel on the substrate;
   a cover layer disposed on the substrate and extending in a first direction to provide a tunnel-shaped cavity extending in a second direction crossing the first direction corresponding to the pixel;
   a liquid crystal layer disposed in the tunnel-shaped cavity, the liquid crystal layer having an upper surface, a lower surface facing the upper surface, and side surfaces connected to the upper surface and the lower surface;
   a first electrode disposed between the liquid crystal layer and the cover layer and a second electrode spaced apart from the first electrode, the first and the second electrodes being configured to apply an electric field to the liquid crystal layer; and
   a sealant layer covering the cover layer,
   wherein the upper surface and opposing two side surfaces in the first direction are covered with the cover layer,
   wherein opposing two side surfaces in the second direction are covered with the sealant layer, and
   wherein the liquid crystal layer comprises a plurality of domains defined by liquid crystal molecules pre-aligned in different directions.

2. The display device of claim 1, wherein the sealant layer comprise an organic polymer, wherein the organic polymer is parylene.

3. The display device of claim 2, wherein the organic polymer is parylene-C, parylene-N, or parylene-HT.

4. The display device of claim 1, further comprising:
   a first polarization plate disposed under the substrate; and
   a second polarization plate disposed on the sealant layer,
   wherein the liquid crystal layer is disposed between the first and second polarization plates.

5. The display device of claim 4, further comprising:
   a first quarter wave plate disposed between the substrate and the first polarization plate; and
   a second quarter wave plate disposed between the sealant layer and the second polarization plate.

6. The display device of claim 5, wherein:
   the first polarization plate comprises a first polarization axis substantially perpendicular to a second polarization axis of the second polarization plate; and
   the first quarter wave plate comprises a first optical axis substantially perpendicular to a second optical axis of the second quarter wave plate.

7. The display device of claim 6, wherein:
   an angle between the first polarization axis and the first optical axis is about 45 degrees; and
   an angle between the second polarization axis and the second optical axis is about 45 degrees.

8. The display device of claim 1, wherein the liquid crystal layer comprises positive type liquid crystal molecules.

9. The display device of claim 1, wherein at least one of the first and second electrodes comprises a transparent conductive material.

10. The display device of claim 9, wherein the first electrode is insulated from the second electrode.

11. The display device of claim 1, wherein a light incident in the liquid crystal layer is penetrate when the electric field is not applied to the liquid crystal layer.

12. A display device, comprising:
    a substrate;
    a cover layer disposed on the substrate, the cover layer comprising a tunnel-shaped cavity therein;
    a liquid crystal layer disposed in the tunnel-shaped cavity;
    an electrode disposed between the liquid crystal layer and the cover layer, the electrode being configured to apply an electric field to the liquid crystal layer; and
    a sealant layer covering an upper surface of the cover layer and configured to seal opposing lateral openings in the tunnel-shaped cavity, the cover layer being disposed between the sealant layer and the electrode in a direction substantially perpendicular to the substrate,
    wherein the sealant layer comprises an organic polymer, wherein the organic polymer is parylene.

13. The display device of claim 12, wherein the liquid crystal layer comprises a plurality of domains defined by liquid crystal molecules pre-aligned in different directions.

14. The display device of claim 12, wherein the organic polymer is parylene-C, parylene-N, or parylene-HT.

* * * * *